(12) United States Patent
Suzuki et al.

(10) Patent No.: US 10,750,556 B2
(45) Date of Patent: Aug. 18, 2020

(54) WIRELESS COMMUNICATION DEVICE AND OPERATING SYSTEM

(71) Applicant: SHIMANO INC., Sakai (JP)

(72) Inventors: Takafumi Suzuki, Sakai (JP); Makoto Usui, Sakai (JP); Takaya Masuda, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 16/216,902

(22) Filed: Dec. 11, 2018

(65) Prior Publication Data

US 2020/0187279 A1    Jun. 11, 2020

(51) Int. Cl.
*H04W 76/14*      (2018.01)
*H04W 52/02*      (2009.01)

(52) U.S. Cl.
CPC ......... *H04W 76/14* (2018.02); *H04W 52/028* (2013.01); *H04W 52/0254* (2013.01); *H04W 52/0277* (2013.01); *H04W 52/0225* (2013.01)

(58) Field of Classification Search
CPC ........... B62J 2099/004; H04M 1/7253; H04M 2250/02; H04W 8/005; H04W 76/10
See application file for complete search history.

(56) References Cited

U.S. PATENT DOCUMENTS

| | | | | |
|---|---|---|---|---|
| 7,760,078 B2 * | 7/2010 | Miki | ...................... | B62M 25/08 340/432 |
| 7,813,715 B2 * | 10/2010 | McKillop | ............. | G06F 21/445 455/410 |
| 8,843,317 B1 * | 9/2014 | Ledet | ...................... | G01C 21/00 701/526 |
| 9,026,053 B2 * | 5/2015 | Molettiere | ............... | H04B 7/26 455/41.2 |
| 2009/0143012 A1 * | 6/2009 | Jeon | ...................... | H04W 52/50 455/41.2 |

(Continued)

FOREIGN PATENT DOCUMENTS

| | | |
|---|---|---|
| JP | 05-106376 | 4/1993 |
| JP | 2008-260399 | 10/2008 |

(Continued)

*Primary Examiner* — Matthew C Sams
(74) *Attorney, Agent, or Firm* — Mori & Ward, LLP

(57) ABSTRACT

A wireless communication device for a human-powered vehicle comprises a wireless communicator and a controller. The wireless communicator is configured to wirelessly receive a control signal from an operating wireless communicator of an operating device. The wireless communicator has a first mode and a second mode. The wireless communicator is configured to wirelessly transmit a connection demand signal in the second mode to establish wireless communication between the wireless communicator and an external wireless communicator of an external electric device different from the operating device. The wireless communicator is configured to wirelessly receive a connection signal which is wirelessly transmitted in response to the connection demand signal from the external wireless communicator of the external electric device. The controller is configured to set the wireless communicator with the first mode if the connection signal indicates that the external electric device is the paired device.

16 Claims, 18 Drawing Sheets

(56) References Cited

U.S. PATENT DOCUMENTS

| | | | |
|---|---|---|---|
| 2009/0315692 A1* | 12/2009 | Miki | B62K 23/02 |
| | | | 340/432 |
| 2010/0198453 A1* | 8/2010 | Dorogusker | A61B 5/11 |
| | | | 701/31.4 |
| 2014/0102237 A1* | 4/2014 | Jordan | F16H 59/044 |
| | | | 74/473.12 |
| 2016/0257370 A1* | 9/2016 | Hashimoto | B62M 25/08 |
| 2016/0339986 A1 | 11/2016 | Jordan et al. | |
| 2017/0201611 A1* | 7/2017 | Donley | H04M 1/7253 |
| 2017/0201931 A1* | 7/2017 | Swanzey | H04L 63/0869 |
| 2019/0246437 A1* | 8/2019 | Chuang | H04W 76/10 |
| 2019/0250619 A1* | 8/2019 | Gillett | B62K 23/02 |

FOREIGN PATENT DOCUMENTS

| | | | | |
|---|---|---|---|---|
| WO | WO-2011120124 A1 * | 10/2011 | | B62M 6/45 |
| WO | WO-2016007188 A1 * | 1/2016 | | H04W 4/60 |

* cited by examiner

WIRELESS COMMUNICATION DEVICE AND OPERATING SYSTEM

BACKGROUND OF THE INVENTION

Field of the Invention

The present invention relates to a wireless communication device and an operating system.

DISCUSSION OF THE BACKGROUND

A human-powered vehicle includes a wireless communication system configured to operate a wireless component.

SUMMARY OF THE INVENTION

In accordance with a first aspect of the present invention, a wireless communication device for a human-powered vehicle comprises a wireless communicator and a controller. The wireless communicator is configured to wirelessly receive a control signal from an operating wireless communicator of an operating device. The wireless communicator has a first mode in which the wireless communicator receives the control signal from the operating wireless communicator and a second mode in which the wireless communicator ignores the control signal from the operating wireless communicator. The controller is configured to store paired device information indicating a paired device which has been paired with the wireless communication device. The wireless communicator is configured to wirelessly transmit a connection demand signal in the second mode to establish wireless communication between the wireless communicator and an external wireless communicator of an external electric device different from the operating device. The wireless communicator is configured to wirelessly receive a connection signal which is wirelessly transmitted in response to the connection demand signal from the external wireless communicator of the external electric device. The controller is configured to set the wireless communicator with the first mode if the connection signal indicates that the external electric device is the paired device.

With the wireless communication device according to the first aspect, it is possible to set the wireless communicator with the first mode using the external electric device. This can improve convenience of the wireless communication device.

In accordance with a second aspect of the present invention, the wireless communication device according to the first aspect is configured so that the wireless communicator is configured to establish wireless communication between the wireless communicator and the external wireless communicator of the external electric device if the connection signal indicates that the external electric device is the paired device.

With the wireless communication device according to the second aspect, it is possible to easily establish wireless communication between the wireless communicator and the external wireless communicator.

In accordance with a third aspect of the present invention, the wireless communication device according to the second aspect is configured so that the controller is configured to set the wireless communicator with the first mode after the wireless communicator establishes wireless communication between the wireless communicator and the external wireless communicator of the external electric device if the connection signal indicates that the external electric device is the paired device.

With the wireless communication device according to the third aspect, it is possible to smooth setting of the first mode.

In accordance with a fourth aspect of the present invention, the wireless communication device according to any one of the first to third aspects is configured so that the wireless communicator runs on a first power consumption in the first mode and runs on a second power consumption which is lower than the first power consumption in the second mode.

With the wireless communication device according to the fourth aspect, it is possible to reduce power consumption in the second mode.

In accordance with a fifth aspect of the present invention, the wireless communication device according to any one of the first to third aspects is configured so that the wireless communicator runs on a first power consumption in the first mode. The wireless communicator has a third mode in which the wireless communicator runs on a third power consumption which is lower than the first power consumption.

With the wireless communication device according to the fifth aspect, it is possible to reduce power consumption in the third mode.

In accordance with a sixth aspect of the present invention, the wireless communication device according to the fifth aspect is configured so that the controller is configured to set the wireless communicator with the third mode if a mode-change condition is satisfied in one of the first mode and the second mode.

With the wireless communication device according to the sixth aspect, it is possible to shorten a period of at least one of the first mode and the second mode.

In accordance with a seventh aspect of the present invention, the wireless communication device according to the sixth aspect is configured so that the mode-change condition includes that a determination time elapses without receiving the control signal from the operating wireless communicator of the operating device in one of the first mode and the second mode.

With the wireless communication device according to the seventh aspect, it is possible to automatically set the wireless communicator with the third mode if the wireless communication device does not receive the control signal during the determination time.

In accordance with an eighth aspect of the present invention, the wireless communication device according to the sixth aspect is configured so that the mode-change condition includes that the wireless communicator receives a mode-change signal from the external wireless communicator of the external electric device in one of the first mode and the second mode.

With the wireless communication device according to the eighth aspect, it is possible to forcibly set the wireless communicator with the third mode.

In accordance with a ninth aspect of the present invention, the wireless communication device according to the fifth aspect is configured so that the controller is configured to detect a state signal transmitted from a usage state sensor configured to sense a usage state of the human-powered vehicle. The controller is configured to set the wireless communicator with the second mode if the controller concludes that the state signal indicates that the human-powered vehicle is in use as the wireless communicator is in the third mode.

With the wireless communication device according to the ninth aspect, it is possible to automatically set the wireless communicator with the second mode using the usage state sensor.

In accordance with a tenth aspect of the present invention, the wireless communication device according to the ninth aspect is configured so that the usage state sensor includes an acceleration sensor configured to sense acceleration applied to the human-powered vehicle. The controller is configured to set the wireless communicator with the second mode if the controller concludes that the state signal indicates that the acceleration exceeds an acceleration threshold as the wireless communicator is in the third mode.

With the wireless communication device according to the tenth aspect, it is possible to automatically set the wireless communicator with the second mode using the acceleration sensed by the usage state sensor.

In accordance with an eleventh aspect of the present invention, the wireless communication device according to any one of the first to tenth aspects further comprises a switch configured to receive a user input. The controller is configured to set the wireless communicator with the first mode if the controller detects the user input of the switch in one of the second mode and the third mode.

With the wireless communication device according to the eleventh aspect, it is possible to forcibly set the wireless communicator with the first mode using the switch regardless of the external electric device.

In accordance with a twelfth aspect of the present invention, the wireless communication device according to the eleventh aspect is configured so that the controller is configured to count a total number of operation times that the switch receives the user input. The controller is configured to set the wireless communicator with the first mode if the controller detects the user input of the switch in one of the second mode and the third mode and if the controller concludes that the total number of operation times is equal to or smaller than a determination threshold.

With the wireless communication device according to the twelfth aspect, it is possible to forcibly set the wireless communicator with the first mode using the switch within the determination threshold.

In accordance with a thirteenth aspect of the present invention, the wireless communication device according to the twelfth aspect is configured so that the controller is configured to maintain the wireless communicator in the one of the second mode and the third mode as the controller concludes that the total number of operation times exceeds the determination threshold even if the controller detects the user input of the switch in the one of the second mode and the third mode.

With the wireless communication device according to the thirteenth aspect, it is possible to forcibly set the wireless communicator with the first mode using the switch within the determination threshold.

In accordance with a fourteenth aspect of the present invention, the wireless communication device according to the thirteenth aspect is configured so that the controller is configured to reset the total number of operation times if the wireless communicator establishes wireless communication between the wireless communicator and the external wireless communicator of the external electric device.

With the wireless communication device according to the fourteenth aspect, it is possible to rest the total number of operation times using the external electric device.

In accordance with a fifteenth aspect of the present invention, an operating system for a human-powered vehicle comprises the wireless communication device according to any one of the first to fourteenth aspects. The external electric device includes the external wireless communicator configured to wirelessly transmit the connection signal.

With the operating system according to the fifteenth aspect, it is possible to improve convenience of the operating system using the wireless communicator and the external electric device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
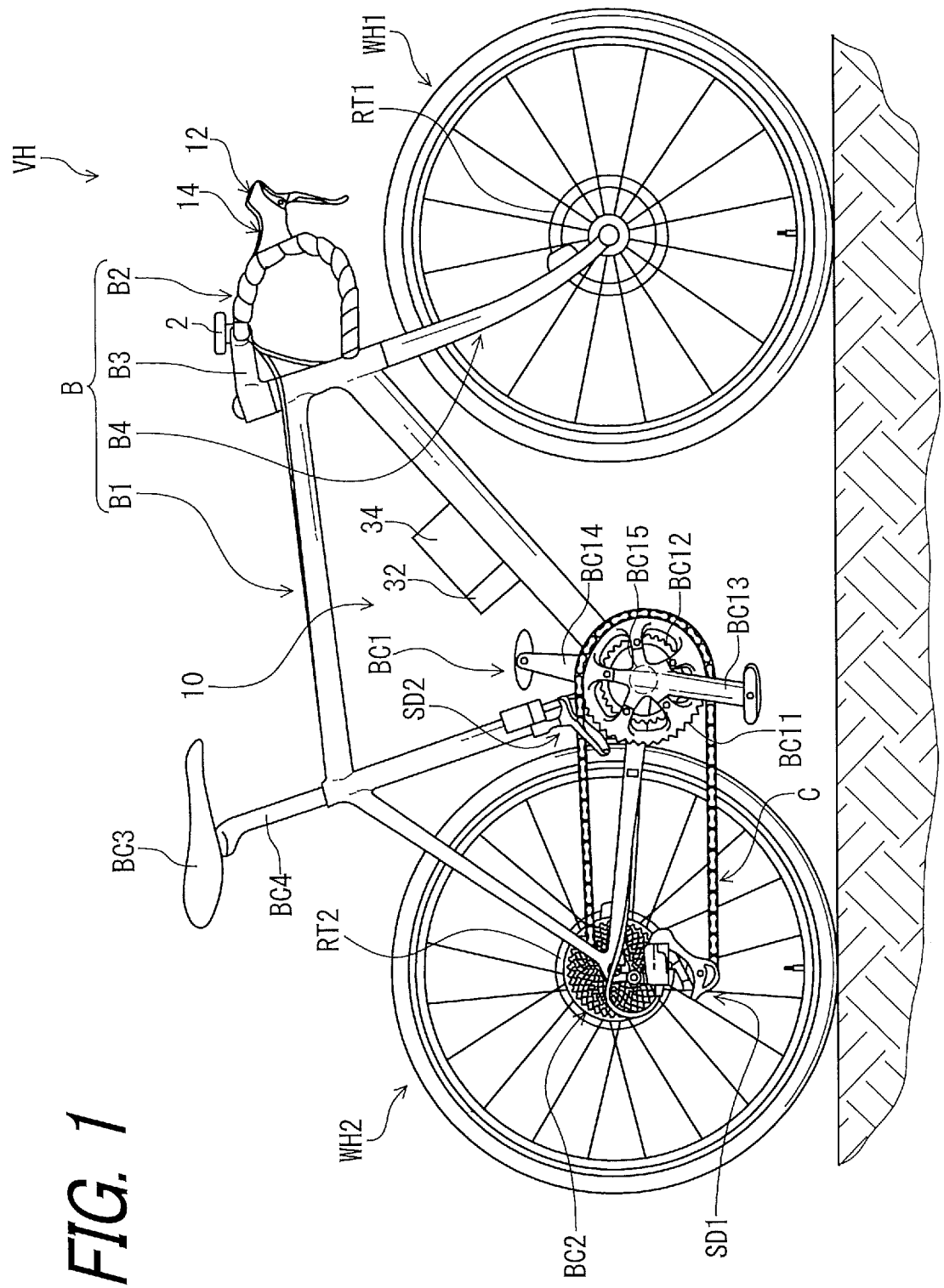
FIG. 1 is a side elevational view of a human-powered vehicle provided with an operating system in accordance with a first embodiment.

The embodiment(s) will now be described with reference to the accompanying drawings, wherein like reference numerals designate corresponding or identical elements throughout the various drawings.

Referring initially to FIG. 1, a human-powered vehicle VH includes an operating system 10 in accordance with an embodiment. For example, the human-powered vehicle VH is a vehicle to travel with a motive power including at least a human power of a user who rides the human-powered vehicle VH (i.e., rider). The human-powered vehicle VH has an arbitrary number of wheels. For example, the human-powered vehicle VH has at least one wheel. In this embodiment, the human-powered vehicle VH preferably has a smaller size than that of a four-wheeled automobile. However, the human-powered vehicle VH can have an arbitrary size. For example, the human-powered vehicle VH can have a larger size than that of the four-wheeled automobile. Examples of the human-powered vehicle VH include a bicycle, a tricycle, and a kick scooter. In this embodiment, the human-powered vehicle VH is a bicycle. An electric assisting system including an electric motor can be applied to the human-powered vehicle VH (e.g., the bicycle) to assist muscular motive power of the user. Namely, the human-powered vehicle VH can be an E-bike. While the human-powered vehicle VH is illustrated as a road bike, the operating system 10 can be applied to mountain bikes or any type of human-powered vehicles.

As seen in FIG. 1, the human-powered vehicle VH includes a vehicle body B, a crank BC1, a rear sprocket assembly BC2, a saddle BC3, a seatpost BC4, a chain C, and wheels WH1 and WH2. The vehicle body B includes a vehicle frame B1, a handlebar B2, a stem B3, and a front fork B4. The stem B3 couples the handlebar B2 to the front fork B4 with the stem B3. A notification device 2 such as a cycle computer is attached to the stem B3. The crank BC1 includes sprocket wheels BC11 and BC12, crank arms BC13 and BC14, and a crank axle BC15. The crank arms BC13 and BC14 are secured to the crank axle BC15. The sprocket wheels BC11 and BC12 are secured to at least one of the crank arm BC13 and the crank axle BC15. The chain C engages with the rear sprocket assembly BC2 and the sprocket wheels BC11 and BC12 of the crank BC1. In this embodiment, the crank BC1 has two speed stages, and the rear sprocket assembly BC2 has eleven speed stages.

In this embodiment, the human-powered vehicle VH includes shift changing devices SD1 and SD2 configured to change speed stages. More specifically, the shift changing device SD1 includes a rear derailleur configured to shift the chain C between sprockets of the rear sprocket assembly BC2. The shift changing device SD2 includes a front derailleur configured to shift the chain C between the sprocket wheels BC11 and BC12 of the crank BC1.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on the saddle BC3 of the human-powered vehicle VH with facing the handlebar B2. Accordingly, these terms, as utilized to describe the operating system 10 or other components, should be interpreted relative to the human-powered vehicle VH equipped with the operating system 10 as used in an upright riding position on a horizontal surface.

Figure 2:
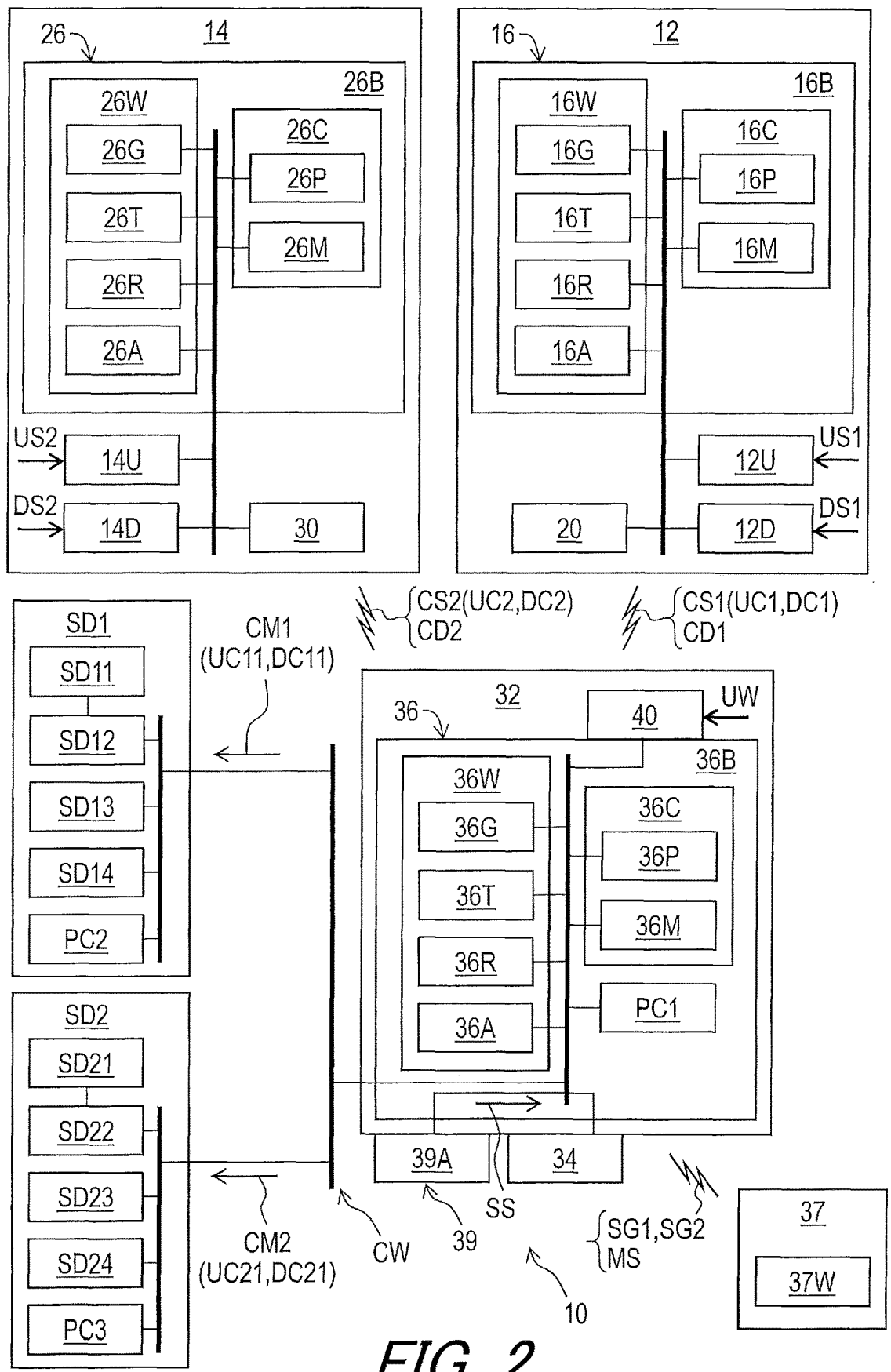
FIG. 2 is a schematic block diagram of the operating system of the human-powered vehicle illustrated in FIG. 1.

As seen in FIG. 2, the human-powered vehicle VH includes operating devices 12 and 14. The operating device 12 is configured to control the shift changing device SD1 to upshift or downshift in response to a user upshift input US1 or a user downshift input DS1. The operating device 14 is configured to control the shift changing device SD2 to upshift or downshift in response to a user upshift input US2 or a user downshift input DS2.

Figure 3:
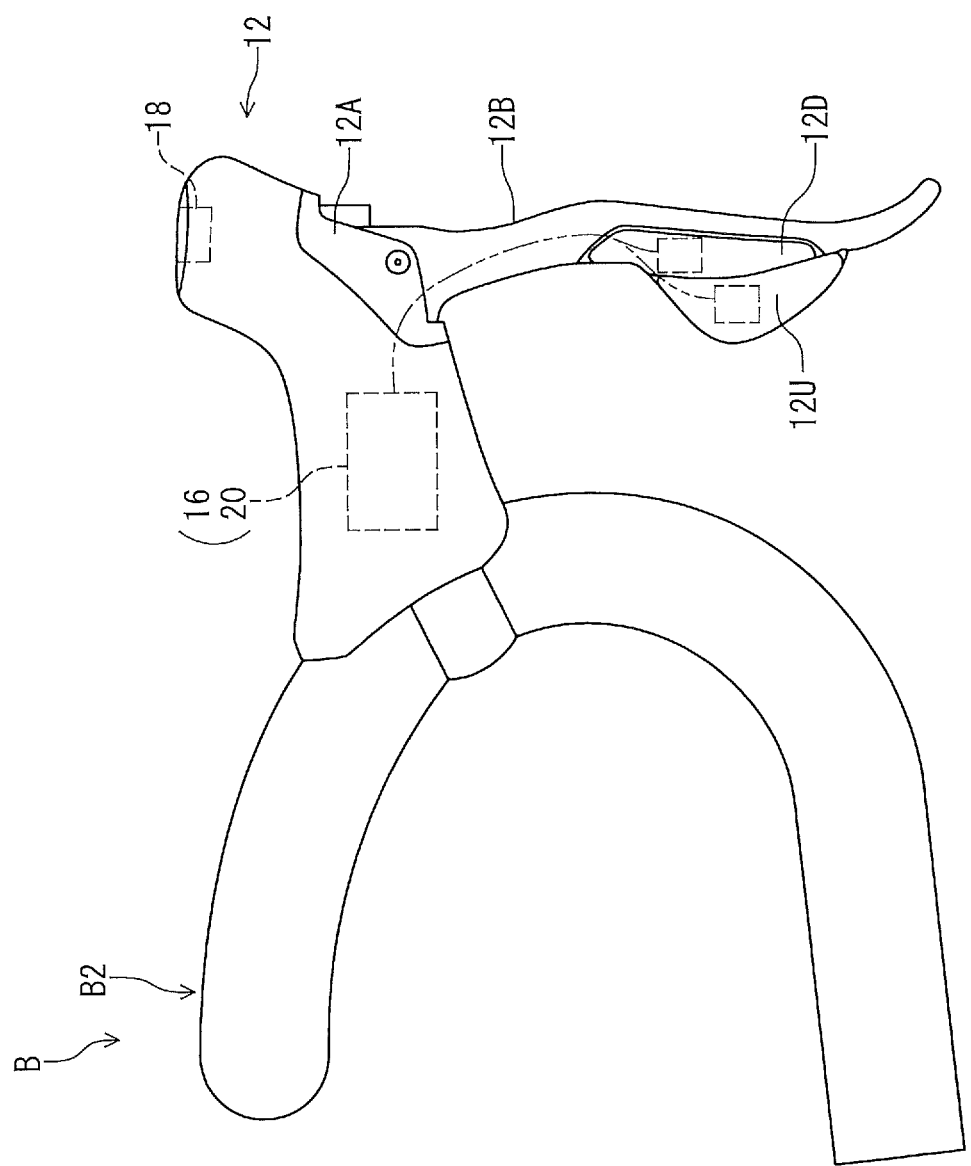
FIG. 3 is a side elevational view of an operating device of the operating system illustrated in FIG. 2.

As seen in FIG. 3, the operating device 12 includes an upshift switch 12U and a downshift switch 12D. The upshift switch 12U is configured to receive the user upshift input US1. The downshift switch 12D is configured to receive the user downshift input DS1. The operating device 12 includes a base member 12A and an operating member 12B. The base member 12A is configured to be mounted to the handlebar B2. The operating member 12B is pivotally coupled to the base member 12A. The upshift switch 12U and the downshift switch 12D are attached to the operating member 12B.

Figure 4:
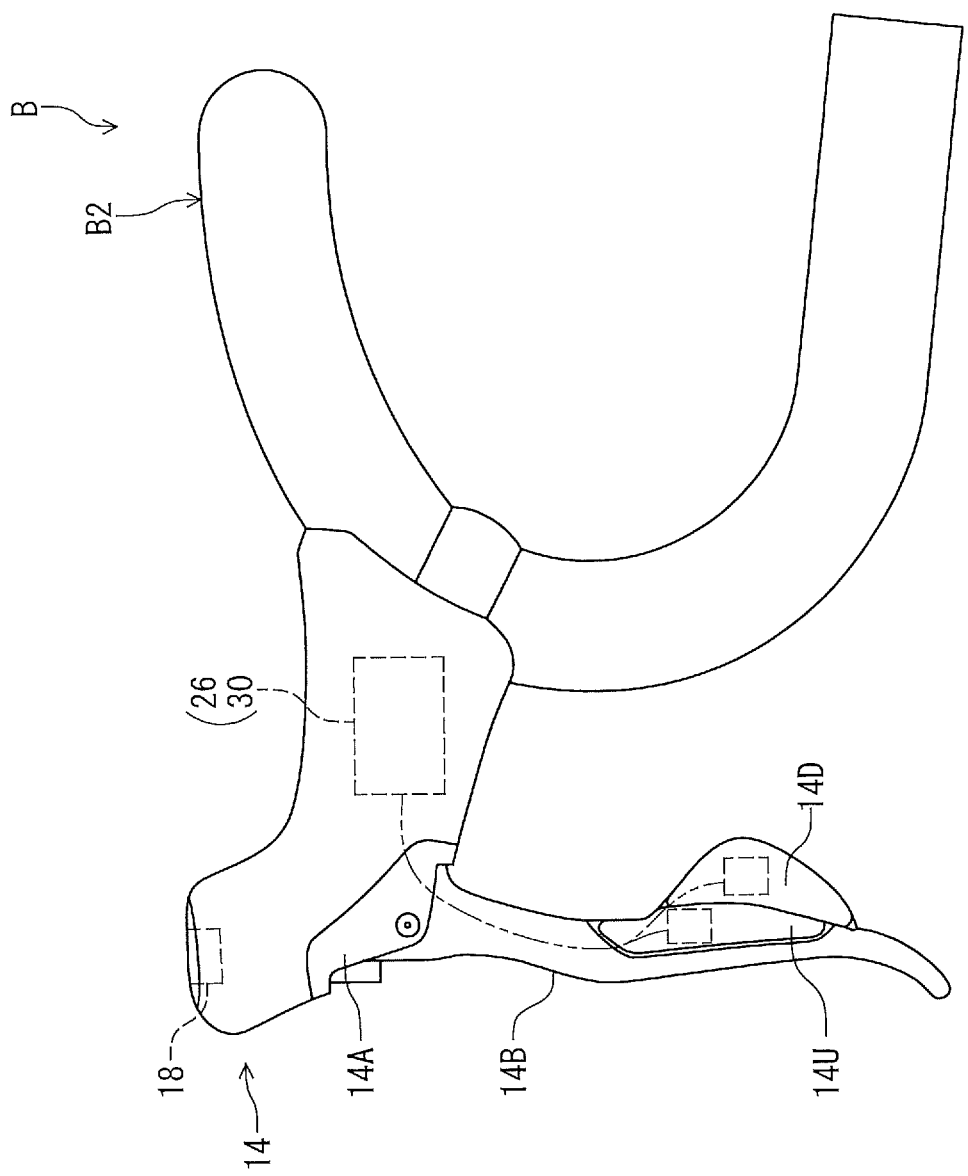
FIG. 4 is a side elevational view of an operating device of the operating system illustrated in FIG. 2.

As seen in FIG. 4, the operating device 14 includes an upshift switch 14U and a downshift switch 14D. The upshift switch 14U is configured to receive the user upshift input US2. The downshift switch 14D is configured to receive the user downshift input DS2. The operating device 14 includes a base member 14A and an operating member 14B. The base member 14A is configured to be mounted to the handlebar B2. The operating member 14B is pivotally coupled to the base member 14A. The upshift switch 14U and the downshift switch 14D are attached to the operating member 14B.

As seen in FIG. 2, the operating system 10 for the human-powered vehicle VH comprises an operating wireless communication device 16. In this embodiment, the operating wireless communication device 16 is provided in the operating device 12. As seen in FIG. 3, the operating wireless communication device 16 is provided in the base member 12A of the operating device 12. However, the operating wireless communication device 16 can be provided at other locations or in another device.

As seen in FIG. 2, the operating wireless communication device 16 for the human-powered vehicle VH comprises an operating wireless communicator 16W and a controller 16C. The operating wireless communicator 16W is configured to wirelessly communicate with another wireless communicator.

In this embodiment, the operating wireless communication device 16 includes a circuit board 16B. The controller 16C includes a processor 16P and a memory 16M which are electrically mounted on the circuit board 16B. The processor 16P includes a central processing unit (CPU) and a memory controller. The memory 16M is connected to the processor 16P. The memory 16M includes a read only memory (ROM) and a random-access memory (RAM). The ROM includes a non-transitory computer-readable storage medium. The RAM includes a transitory computer-readable storage medium. The memory 16M includes storage areas each having an address in the ROM and the RAM. The processor 16P controls the memory 16M to store data in the storage areas of the memory 16M and reads data from the storage areas of the memory 16M. The memory 16M (e.g., the ROM) stores a program. The program is read into the processor 16P, and thereby algorithms of the operating wireless communication device 16.

The operating wireless communicator 16W includes a signal generating circuit 16G, a signal transmitting circuit 16T, a signal receiving circuit 16R, and an antenna 16A. The signal generating circuit 16G generates wireless signals (e.g., a control signal CS1 such as an upshift control signal UC1 or a downshift control signal DC1) based on each of the user upshift input US1 and the user downshift input DS1 received by the upshift and downshift switches 12U and 12D of the operating device 12. The signal generating circuit 16G superimposes digital signals on carrier wave using a predetermined wireless communication protocol to generate the wireless signals. The signal transmitting circuit 16T transmits the wireless signal via the antenna 16A in response to the electric signal which is input from each of the upshift and downshift switches 12U and 12D. In this embodiment, the signal generating circuit 16G can encrypt control information (e.g., shift information) to generate encrypted wireless signals. The signal generating circuit 16G encrypts digital signals stored in the memory 16M using a cryptographic key. The signal transmitting circuit 16T transmits the encrypted wireless signals. Thus, the operating wireless communication device 16 wirelessly transmits the wireless signal to establish wireless communication.

Further, the signal receiving circuit 16R receives a wireless signal (e.g., a connection demand signal CD1) from an additional wireless communication device via the antenna 16A. In this embodiment, the signal receiving circuit 16R decodes the wireless signal to recognize information wirelessly transmitted from the additional wireless communication device. The signal receiving circuit 16R may decrypt the encrypted wireless signal using the cryptographic key. Namely, the operating wireless communication device 16 is configured to transmit a wireless signal to control an additional electrical component and to receive a wireless signal to recognize information from the additional electrical component. In other words, the operating wireless communication device 16 is provided as a wireless transmitter and a wireless receiver. In this embodiment, the operating wireless communication device 16 is integrally provided as a single unit. However, the operating wireless communication device 16 can be constituted of a wireless transmitter and a wireless receiver which are provided as separate units arranged at different positions from each other.

The operating wireless communication device 16 further comprises a power supply 20. The power supply 20 is electrically connected to the operating wireless communication device 16 to supply electricity to the operating wireless communication device 16. Examples of the power supply 20 include a battery and a piezoelectric device generating power in response to the operation of one of the upshift and downshift switches 12U and 12D.

As seen in FIG. 2, the operating system 10 for the human-powered vehicle VH comprises an operating wireless communication device 26. In this embodiment, the operating wireless communication device 26 is provided in the operating device 12. As seen in FIG. 4, the operating wireless communication device 26 is provided in the base member 14A of the operating device 14. However, the operating wireless communication device 26 can be provided at other locations or in another device.

As seen in FIG. 2, the operating wireless communication device 26 for the human-powered vehicle VH comprises an operating wireless communicator 26W and a controller 26C. The operating wireless communicator 26W is configured to wirelessly communicate with another wireless communicator.

In this embodiment, the operating wireless communication device 26 includes a circuit board 26B. The controller 26C includes a processor 26P and a memory 26M which are electrically mounted on the circuit board 26B. The processor 26P includes a central processing unit (CPU) and a memory controller. The memory 26M is connected to the processor 26P. The memory 26M includes a read only memory (ROM) and a random-access memory (RAM). The ROM includes a non-transitory computer-readable storage medium. The RAM includes a transitory computer-readable storage medium. The memory 26M includes storage areas each having an address in the ROM and the RAM. The processor 26P controls the memory 26M to store data in the storage areas of the memory 26M and reads data from the storage areas of the memory 26M. The memory 26M (e.g., the ROM) stores a program. The program is read into the processor 26P, and thereby algorithms of the operating wireless communication device 26.

The operating wireless communicator 26W includes a signal generating circuit 26G, a signal transmitting circuit 26T, a signal receiving circuit 26R, and an antenna 26A. The signal generating circuit 26G generates wireless signals (e.g., a control signal CS2 such as an upshift control signal UC2 or a downshift control signal DC2) based on each of the user upshift input US2 and the user downshift input DS2 received by the upshift and downshift switches 14U and 14D of the operating device 14. The signal generating circuit 26G superimposes digital signals on carrier wave using a predetermined wireless communication protocol to generate the wireless signals. The signal transmitting circuit 26T transmits the wireless signal via the antenna 26A in response to the electric signal which is input from each of the upshift and downshift switches 14U and 14D. In this embodiment, the signal generating circuit 26G can encrypt control information (e.g., shift information) to generate encrypted wireless signals. The signal generating circuit 26G encrypts digital signals stored in the memory 26M using a cryptographic key. The signal transmitting circuit 26T transmits the encrypted wireless signals. Thus, the operating wireless communication device 26 wirelessly transmits the wireless signal to establish wireless communication.

Further, the signal receiving circuit 26R receives a wireless signal (e.g., a connection demand signal CD2) from an additional wireless communication device via the antenna 26A. In this embodiment, the signal receiving circuit 26R decodes the wireless signal to recognize information wirelessly transmitted from the additional wireless communication device. The signal receiving circuit 26R may decrypt the encrypted wireless signal using the cryptographic key. Namely, the operating wireless communication device 26 is configured to transmit a wireless signal to control an additional electrical component and to receive a wireless signal to recognize information from the additional electrical component. In other words, the operating wireless communication device 26 is provided as a wireless transmitter and a wireless receiver. In this embodiment, the operating wireless communication device 26 is integrally provided as a single unit. However, the operating wireless communication device 26 can be constituted of a wireless transmitter and a wireless receiver which are provided as separate units arranged at different positions from each other.

The operating wireless communication device 26 further comprises a power supply 30. The power supply 30 is electrically connected to the operating wireless communication device 26 to supply electricity to the operating wireless communication device 26. Examples of the power supply 30 include a battery and a piezoelectric device generating power in response to the operation of the upshift and downshift switches 14U and 14D.

As seen in FIG. 1, the human-powered vehicle VH includes a master unit 32 and a power supply 34. The master unit 32 is attached to the vehicle body B. The power supply 34 is mounted on the master unit 32. As seen in FIG. 2, the master unit 32 is electrically connected to the shift changing devices SD1 and SD2 and the power supply 34 with an electrical communication wiring CW. Examples of the power supply 34 include a battery. The power supply 34 is configured to supply electricity to the master unit 32 and the shift changing devices SD1 and SD2 through the electrical communication wiring CW.

As seen in FIG. 2, the operating system 10 for the human-powered vehicle VH comprises a wireless communication device 36. The wireless communication device 36 is configured to wirelessly communicate with the operating wireless communication device 16 of the operating device 12 and the operating wireless communication device 26 of the operating device 14. In this embodiment, the wireless communication device 36 is provided in the master unit 32. However, the wireless communication device 36 can be provided in another device.

The wireless communication device 36 for the human-powered vehicle VH comprises a wireless communicator 36W and a controller 36C. The wireless communicator 36W is configured to wirelessly receive a control signal CS1 from the operating wireless communicator 16W of the operating device 12. The wireless communicator 36W is configured to wirelessly receive a control signal CS2 from the operating wireless communicator 26W of the operating device 14. In this embodiment, the wireless communicator 36W is configured to wirelessly receive the upshift control signal UC1 and the downshift control signal DC1 from the operating wireless communicator 16W of the operating device 12. The wireless communicator 36W is configured to wirelessly receive the upshift control signal UC2 and the downshift control signal DC2 from the operating wireless communicator 26W of the operating device 14.

The wireless communicator 36W is configured to generate a control command CM1 based on the control signal CS1. The control command CM1 includes an upshift command UC11 and a downshift command DC11. The wireless communicator 36W is configured to generate the upshift command UC11 based on the upshift control signal UC1. The wireless communicator 36W is configured to generate the downshift command DC11 based on the downshift control signal DC1.

The wireless communicator 36W is configured to generate a control command CM2 based on the control signal CS2. The control command CM2 includes an upshift command UC21 and a downshift command DC21. The wireless communicator 36W is configured to generate the upshift command UC21 based on the upshift control signal UC2. The wireless communicator 36W is configured to generate the downshift command DC21 based on the downshift control signal DC2.

The controller 36C is configured to control the shift changing device SD1 to upshift based on the upshift command UC11 generated by the wireless communicator 36W. The controller 36C is configured to control the shift changing device SD1 to downshift based on the downshift command DC11 generated by the wireless communicator 36W. The controller 36C is configured to control the shift changing device SD2 to upshift based on the upshift command UC21 generated by the wireless communicator 36W. The controller 36C is configured to control the shift changing device SD2 to downshift based on the downshift command DC21 generated by the wireless communicator 36W.

In this embodiment, the wireless communication device 36 includes a circuit board 36B. The controller 36C includes a processor 36P and a memory 36M which are electrically mounted on the circuit board 36B. The processor 36P includes a central processing unit (CPU) and a memory controller. The memory 36M is connected to the processor 36P. The memory 36M includes a read only memory (ROM) and a random-access memory (RAM). The ROM includes a non-transitory computer-readable storage medium. The RAM includes a transitory computer-readable storage medium. The memory 36M includes storage areas each having an address in the ROM and the RAM. The processor 36P controls the memory 36M to store data in the storage areas of the memory 36M and reads data from the storage areas of the memory 36M. The memory 36M (e.g., the ROM) stores a program. The program is read into the processor 36P, and thereby algorithms of the wireless communication device 36.

The controller 36C is configured to store paired device information indicating a paired device which has been paired with the wireless communication device 36. In this embodiment, the memory 36M is configured to store the paired device information. The paired device includes an external electric device 37. The wireless communication device 36 has a unique identifier that is assigned to the wireless communication device 36. The external electric device 37 has a unique identifier that is assigned to the external electric device 37. The paired device information includes the unique identifier of the external electric device 37. The controller 36C stores the unique identifier of the external electric device 37 in the memory 36M after pairing of the wireless communication device 36 and the external electric device 37.

The operating wireless communication device 16 has a unique identifier that is assigned to the operating wireless communication device 16. The operating wireless communication device 26 has a unique identifier that is assigned to the operating wireless communication device 26. The paired device information includes the unique identifier of the operating wireless communication device 16 and the unique identifier of the operating wireless communication device 26. The operating wireless communication device 16 is another paired device which has been paired with the wireless communication device 36. The operating wireless communication device 26 is another paired device which has been paired with the wireless communication device 36.

The wireless communicator 36W includes a signal generating circuit 36G, a signal transmitting circuit 36T, a signal receiving circuit 36R, and an antenna 36A. The signal generating circuit 36G generates wireless signals (e.g., the connection demand signals CD1 and CD2) based on commands generated by the controller 36C. The signal generating circuit 36G superimposes digital signals on carrier wave using a predetermined wireless communication protocol to generate the wireless signals. The signal transmitting circuit 36T transmits the wireless signal via the antenna 36A in response to the commands generated by the controller 36C. In this embodiment, the signal generating circuit 36G can encrypt control information (e.g., shift information) to generate encrypted wireless signals. The signal generating circuit 36G encrypts digital signals stored in the memory 36M using a cryptographic key. The signal transmitting circuit 36T transmits the encrypted wireless signals. Thus, the wireless communication device 36 wirelessly transmits the wireless signal to establish wireless communication.

Further, the signal receiving circuit 36R receives wireless signals (e.g., the control signal CS1 or CS2) from each of the operating devices 12 and 14 via the antenna 36A. In this embodiment, the signal receiving circuit 36R decodes the wireless signal to recognize information wirelessly transmitted from each of the operating devices 12 and 14. The signal receiving circuit 36R may decrypt the encrypted wireless signal using the cryptographic key. Namely, the wireless communication device 36 is configured to transmit a wireless signal to control an additional electrical component and to receive a wireless signal to recognize information from the additional electrical component. In other words, the wireless communication device 36 is provided as a wireless transmitter and a wireless receiver. In this embodiment, the wireless communication device 36 is integrally provided as a single unit. However, the wireless communication device 36 can be constituted of a wireless transmitter and a wireless receiver which are provided as separate units arranged at different positions from each other.

In this embodiment, the master unit 32 and the shift changing devices SD1 and SD2 can communicate with each other through a voltage line using power line communication technology. The power line communication technology is used for communicating between electrical components. Power line communication (PLC) carries data on a conductor that is also used simultaneously for electric power transmission or electric power distribution to the electrical component. In this embodiment, the electric power is supplied from the power supply 34 to the master unit 32 and the shift changing devices SD1 and SD2 through the electrical communication wiring CW. Furthermore, the master unit 32 and the shift changing devices SD1 and SD2 can receive information signals from each other through the electrical communication wiring CW using the PLC.

The PLC uses unique identifying information such as a unique identifier that is assigned to each of electrical components. Each of the shift changing devices SD1 and SD2 is configured to store the unique identifying information. Based on the unique identifying information, the shift changing devices SD1 and SD2 can recognize, based on the unique identifying information, information signals which are necessary for themselves among information signals transmitted via the electrical communication wiring CW. For example, the master unit 32 and the shift changing devices SD1 and SD2 can recognize information signals transmitted from the master unit 32 and the shift changing devices SD1 and SD2 through the electrical communication wiring CW. Instead of using the PLC technology, however, separate signal wires can be provided for transmitting data in addition to the ground wire and the voltage wire if needed and/or desired.

The wireless communication device 36 comprises a PLC controller PC1. The PLC controller PC1 is electrically connected to the wireless communicator 36W. The PLC controller PC1 is connected to the electrical communication wiring CW. The PLC controller PC1 is configured to separate input signals to a power source voltage and control signals. The PLC controller PC1 is configured to regulate the power source voltage to a level at which the wireless communicator 36W can properly operate. The PLC controller PC1 is further configured to superimpose output signals such as the upshift control signal UC1, the downshift control signal DC1, the upshift control signal UC2, and the downshift control signal DC2 on the power source voltage applied to the electrical communication wiring CW from the power supply 34.

As seen in FIG. 2, the shift changing device SD1 includes a chain guide SD11, a motor SD12, a shift position sensor SD13, and a motor driver SD14. The motor SD12, the shift position sensor SD13, and the motor driver SD14 are connected to each other. The motor SD12 is mechanically coupled to the chain guide SD11. The motor SD12 is configured to move the chain guide SD11 to shift the chain C relative to the rear sprocket assembly BC2 (FIG. 1). In this embodiment, the motor SD12 includes a direct-current (DC) motor. The motor SD12 includes a rotational shaft (not shown) to output a rotational force. The rotational shaft is coupled to the chain guide SD11 via a gear reducer (not shown). Other examples of the motor SD12 include a stepper motor and an alternating-current (AC) motor.

The shift position sensor SD13 is configured to sense a position of the motor SD12 as the shift position of the shift changing device SD1. In this embodiment, the shift position sensor SD13 is a contact rotational position sensor such as a potentiometer. The shift position sensor SD13 is configured to sense an absolute rotational position of the rotational shaft of the motor SD12 as the shift position of the shift changing device SD1. Other examples of the shift position sensor SD13 include a non-contact rotational position sensor such as an optical sensor (e.g., a rotary encoder) and a magnetic sensor (e.g., a hall sensor).

The shift position sensor SD13 is electrically connected to the motor driver SD14. The motor driver SD14 is configured to control the motor SD12 based on the rear shift position sensed by the shift position sensor SD13. Specifically, the motor driver SD14 is electrically connected to the motor SD12. The motor driver SD14 is configured to control a rotational direction and a rotational speed of the rotational shaft based on the shift position and each of the upshift control signal UC1 and the downshift control signal DC1. Furthermore, the motor driver SD14 is configured to stop rotation of the rotational shaft to position the chain guide SD11 at one of the low to top gear positions based on the shift position and each of the upshift control signal UC1, and the downshift control signal DC1.

The shift changing device SD1 includes a PLC controller PC2. The PLC controller PC2 is electrically connected to the motor driver SD14. The PLC controller PC2 is connected to the electrical communication wiring CW. The PLC controller PC2 is configured to separate input signals to a power source voltage and control commands such as the upshift command UC11 and the downshift command DC11. The PLC controller PC2 is configured to regulate the power source voltage to a level at which the motor driver SD14 can properly operate.

As seen in FIG. 2, the shift changing device SD2 includes a chain guide SD21, a motor SD22, a shift position sensor SD23, and a motor driver SD24. The motor SD22, the shift position sensor SD23, and the motor driver SD24 are connected to each other. The motor SD22 is mechanically coupled to the chain guide SD21. The motor SD22 is configured to move the chain guide SD21 to shift the chain C relative to the sprocket wheels BC11 and BC12 (FIG. 1). In this embodiment, the motor SD22 includes a direct-current (DC) motor. The motor SD22 includes a rotational shaft (not shown) to output a rotational force. The rotational shaft is coupled to the chain guide SD21 via a gear reducer (not shown). Other examples of the motor SD22 include a stepper motor and an alternating-current (AC) motor.

The shift position sensor SD23 is configured to sense a position of the motor SD22 as the shift position of the shift changing device SD2. In this embodiment, the shift position sensor SD23 is a contact rotational position sensor such as a potentiometer. The shift position sensor SD23 is configured to sense an absolute rotational position of the rotational shaft of the motor SD22 as the shift position of the shift changing device SD2. Other examples of the shift position sensor SD23 include a non-contact rotational position sensor such as an optical sensor (e.g., a rotary encoder) and a magnetic sensor (e.g., a hall sensor).

The shift position sensor SD23 is electrically connected to the motor driver SD24. The motor driver SD24 is configured to control the motor SD22 based on the rear shift position sensed by the shift position sensor SD23. Specifically, the motor driver SD24 is electrically connected to the motor SD22. The motor driver SD24 is configured to control a rotational direction and a rotational speed of the rotational shaft based on the shift position and each of the upshift control signal UC2 and the downshift control signal DC2. Furthermore, the motor driver SD24 is configured to stop rotation of the rotational shaft to position the chain guide SD21 at one of the low to top gear positions based on the shift position and each of the upshift control signal UC2, and the downshift control signal DC2.

The shift changing device SD2 includes a PLC controller PC3. The PLC controller PC3 is electrically connected to the motor driver SD24. The PLC controller PC3 is connected to the electrical communication wiring CW. The PLC controller PC3 is configured to separate input signals to a power source voltage and control commands such as the upshift command UC21, and the downshift command DC21. The PLC controller PC3 is configured to regulate the power source voltage to a level at which the motor driver SD24 can properly operate.

The wireless communicator 36W is configured to establish wireless communication between the wireless communicator 36W and an external electric device 37. Examples of the external electric device 37 include a smartphone, a tablet, a cycle computer, or other electric devices including another wireless communicator. The external electric device 37 includes an external wireless communicator 37W. The external wireless communicator 37W is configured to wirelessly communicate with the wireless communicator 36W. The external wireless communicator 37W is configured to wirelessly transmit a connection signal SG2. The external wireless communicator 37W has substantially the same structure as that of the wireless communicator 36W. Thus, the external wireless communicator 37W will not be described in detail here for the sake of brevity.

Figure 5:
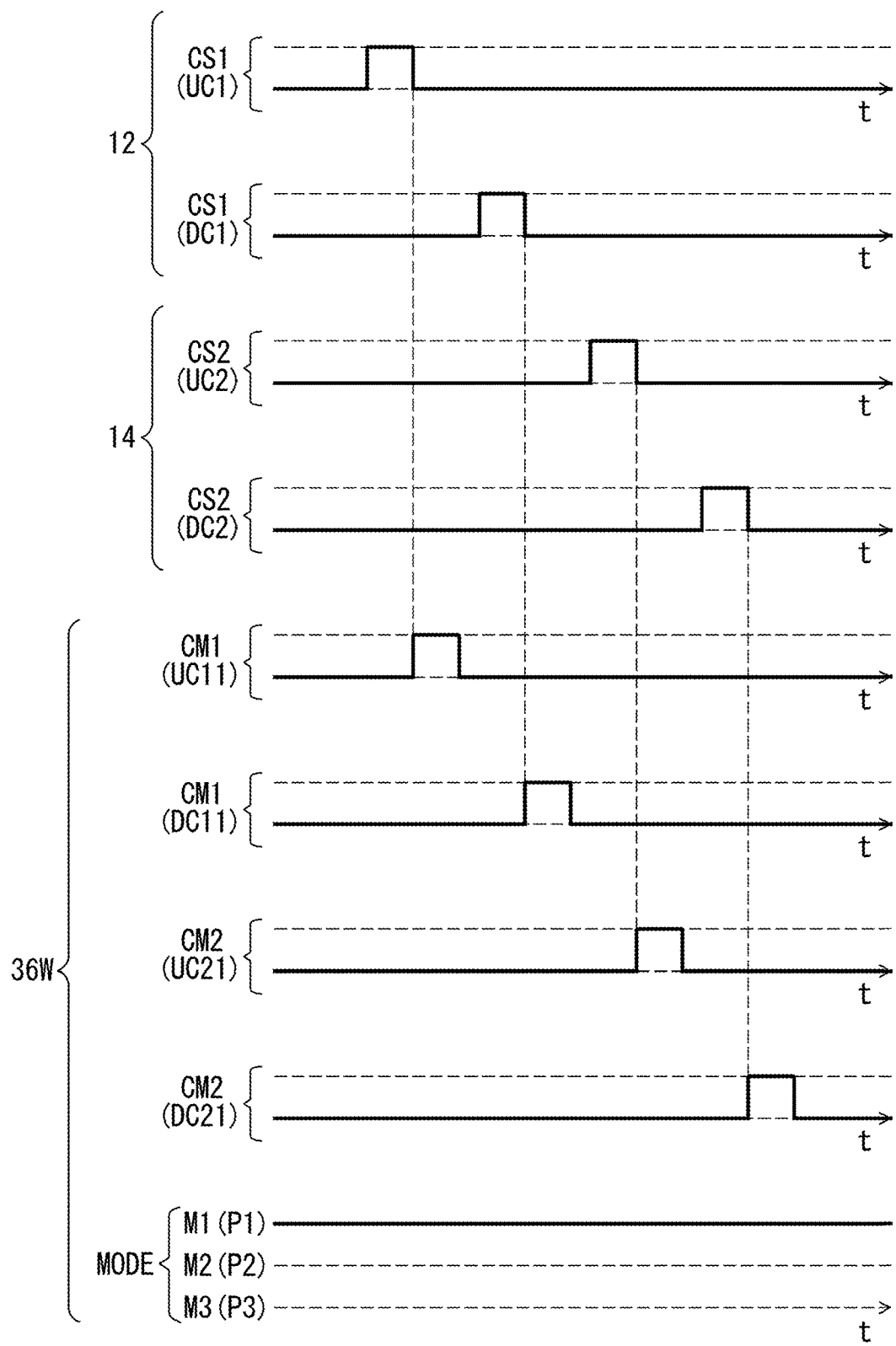
FIGS. 5 to 14 are timing charts of operations of the operating system illustrated in FIG. 2.
Figure 6:
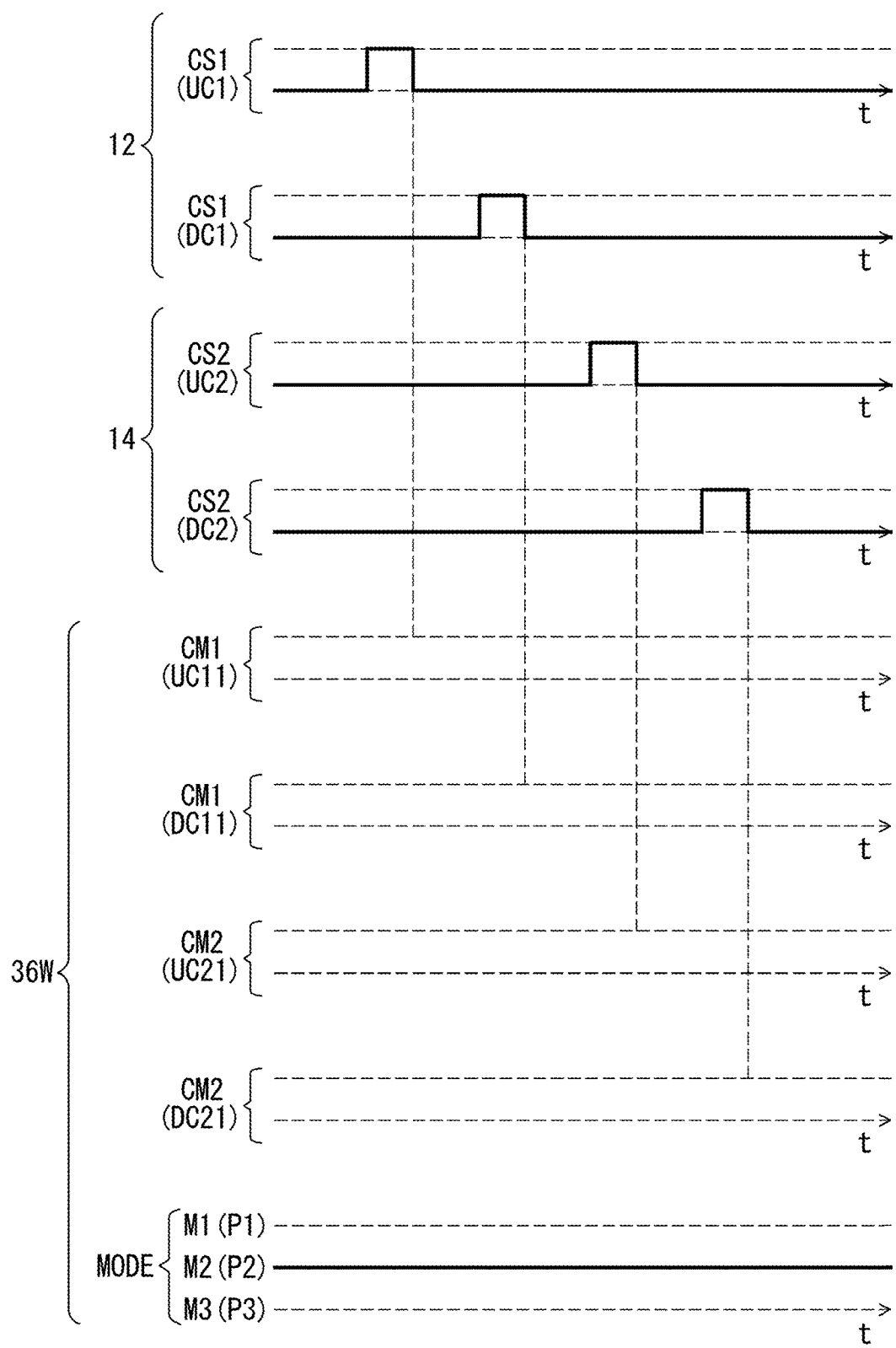

As seen in FIGS. 5 and 6, the wireless communicator 36W has a first mode M1 and a second mode M2. The wireless communicator 36W runs on a first power consumption P1 in the first mode M1. The wireless communicator 36W runs on a second power consumption P2 which is lower than the first power consumption P1 in the second mode M2. The wireless communicator 36W has a third mode M3. The wireless communicator 36W runs on a third power consumption P3 which is lower than the first power consumption P1 in the third mode M3. In this embodiment, the third power consumption P3 is lower than the second power consumption P2. However, the third power consumption P3 can be higher than the second power consumption P2. The first mode M1 can also be referred to as an awake mode. The second mode M2 can also be referred to as a sleep mode. The third mode M3 can also be referred to as a deep sleep mode. The third mode M3 can be omitted from the wireless communicator 36W.

As seen in FIG. 5, the wireless communicator 36W is configured to establish wireless communication between the wireless communicator 36W and the paired device in the first mode M1. In the first mode M1, the wireless communicator 36W receives the control signal CS1 from the operating wireless communicator 16W. Specifically, the wireless communicator 36W is configured to recognize the control signal CS1 from the operating wireless communicator 16W in the first mode M1. The wireless communicator 36W is configured to generate the control command CM1 in the first mode M1 in response to the control signal CS1 wirelessly transmitted from the operating wireless communicator 16W. The wireless communicator 36W is configured to generate the upshift command UC11 in the first mode M1 in response to the upshift control signal UC1 wirelessly transmitted from the operating wireless communicator 16W. The wireless communicator 36W is configured to generate the downshift command DC11 in the first mode M1 in response to the downshift control signal DC1 wirelessly transmitted from the operating wireless communicator 16W.

In the first mode M1, the wireless communicator 36W receives the control signal CS2 from the operating wireless communicator 26W. Specifically, the wireless communicator 36W is configured to recognize the control signal CS2 from the operating wireless communicator 26W in the first mode M1. The wireless communicator 36W is configured to generate the control command CM2 in the first mode M1 in response to the control signal CS2 wirelessly transmitted from the operating wireless communicator 26W. The wireless communicator 36W is configured to generate the upshift command UC21 in the first mode M1 in response to the upshift control signal UC2 wirelessly transmitted from the operating wireless communicator 26W. The wireless communicator 36W is configured to generate the downshift command DC21 in the first mode M1 in response to the downshift control signal DC2 wirelessly transmitted from the operating wireless communicator 26W.

As seen in FIG. 6, the wireless communicator 36W is configured not to establish wireless communication between the wireless communicator 36W and the paired device in the second mode M2. In second mode M2, the wireless communicator 36W ignores the control signal CS1 from the operating wireless communicator 16W. Specifically, the wireless communicator 36W is configured to recognize the control signal CS1 from the operating wireless communicator 16W in the second mode M2. However, the wireless communicator 36W is configured not to generate the control command CM1 in the second mode M2 even if the wireless communicator 36W recognizes the control signal CS1 wirelessly transmitted from the operating wireless communicator 16W. The wireless communicator 36W is configured not to generate the upshift command UC11 in the second mode M2 even if the wireless communicator 36W recognizes the upshift control signal UC1 wirelessly transmitted from the operating wireless communicator 16W. The wireless communicator 36W is configured not to generate the downshift command DC11 in the second mode M2 even if the wireless communicator 36W recognizes the downshift control signal DC1 wirelessly transmitted from the operating wireless communicator 16W.

In second mode M2, the wireless communicator 36W ignores the control signal CS2 from the operating wireless communicator 16W. Specifically, the wireless communicator 36W is configured to recognize the control signal CS2 from the operating wireless communicator 16W in the second mode M2. However, the wireless communicator 36W is configured not to generate the control command CM2 in the second mode M2 even if the wireless communicator 36W recognizes the control signal CS2 wirelessly transmitted from the operating wireless communicator 26W. The wireless communicator 36W is configured not to generate the upshift command UC21 in the second mode M2 even if the wireless communicator 36W recognizes the upshift control signal UC2 wirelessly transmitted from the operating wireless communicator 26W. The wireless communicator 36W is configured not to generate the downshift command DC21 in the second mode M2 even if the wireless communicator 36W recognizes the downshift control signal DC2 wirelessly transmitted from the operating wireless communicator 26W.

Figure 7:
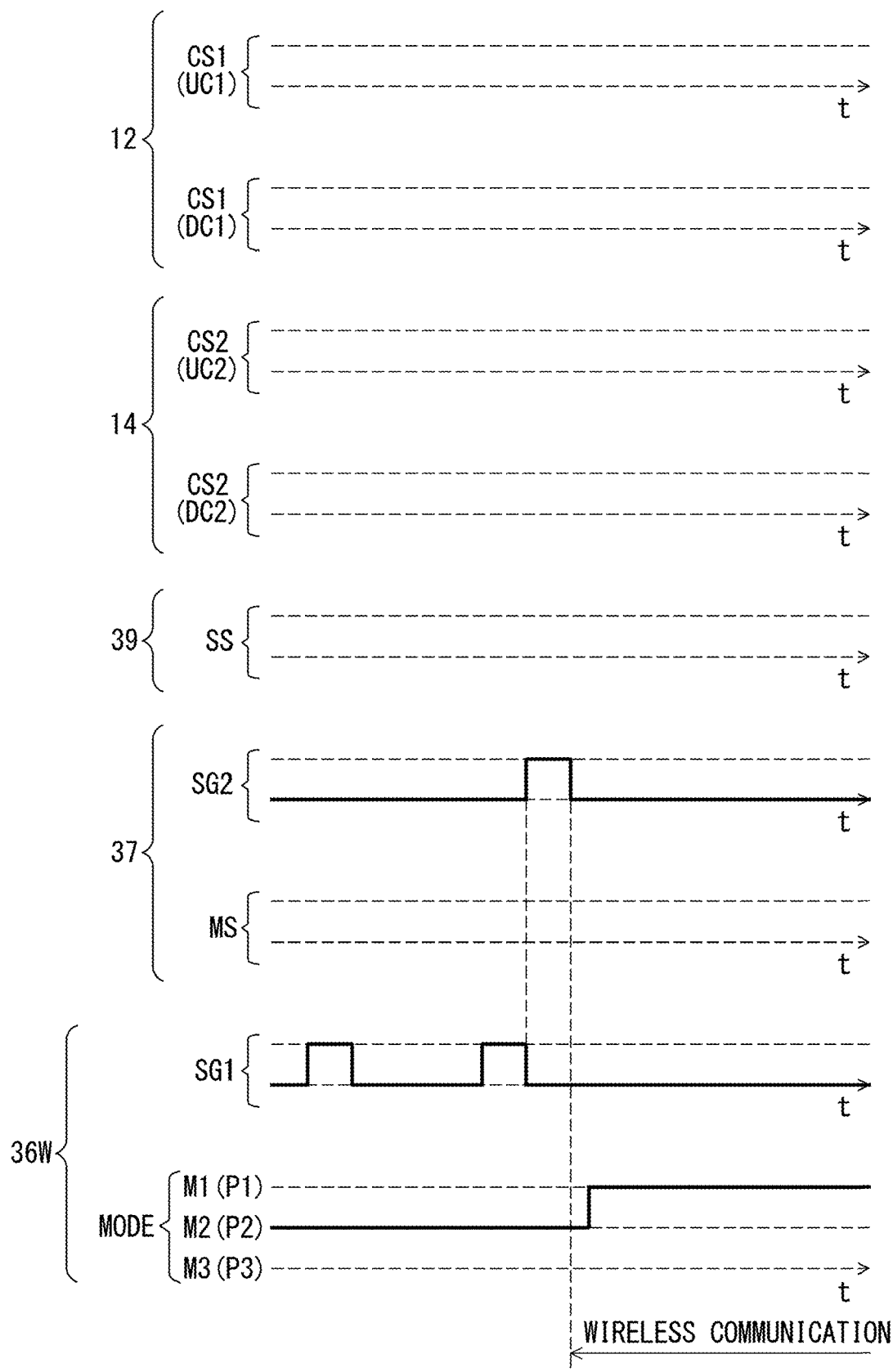

As seen in FIG. 7, the wireless communicator 36W is configured to establish wireless communication between the wireless communicator 36W and the external electric device 37 in the second mode M2. The wireless communicator 36W is configured to wirelessly transmit a connection demand signal SG1 in the second mode M2 to establish wireless communication between the wireless communicator 36W and the external wireless communicator 37W of the external electric device 37 different from the operating device 12. The wireless communicator 36W is configured to wirelessly transmit the connection demand signal SG1 in the second mode M2 to establish wireless communication between the wireless communicator 36W and the external wireless communicator 37W of the external electric device 37 different from the operating device 14. The connection demand signal SG1 includes the unique identifier of the external electric device 37. The external wireless communicator 37W is configured to recognize the connection demand signal SG1 including the unique identifier of the external electric device 37.

The wireless communicator 36W is configured to wirelessly receive a connection signal SG2 which is wirelessly transmitted in response to the connection demand signal SG1 from the external wireless communicator 37W of the external electric device 37. The connection signal SG2 includes the unique identifier of the wireless communication device 36. The wireless communicator 36W is configured to recognize the connection signal SG2 including the unique identifier of the wireless communication device 36. In this embodiment, the wireless communicator 36W is configured to recognize the connection signal SG2 in the second mode M2.

The controller 36C is configured to set the wireless communicator 36W with the first mode M1 if the connection signal SG2 indicates that the external electric device 37 is the paired device. Thus, the connection signal SG2 can also be referred to as a wake-up signal SG2. The connection demand signal SG1 can also be referred to as a wake-up demand signal SG1. In this embodiment, the controller 36C is configured to compare a unique identifier of a device indicated by the connection signal SG2 with the paired device information in the second mode M2. The controller 36C is configured to set the wireless communicator 36W with the first mode M1 if the controller 36C concludes that the paired device information includes the unique identifier of the device indicated by the connection signal SG2.

The wireless communicator 36W is configured to establish wireless communication between the wireless communicator 36W and the external wireless communicator 37W of the external electric device 37 if the connection signal SG2 indicates that the external electric device 37 is the paired device. In this embodiment, the controller 36C is configured to set the wireless communicator 36W with the first mode M1 after the wireless communicator 36W establishes wireless communication between the wireless communicator 36W and the external wireless communicator 37W of the external electric device 37 if the connection signal SG2 indicates that the external electric device 37 is the paired device. However, the controller 36C can be configured to set the wireless communicator 36W with the first mode M1 at substantially the same time as or before the wireless communicator 36W establishes wireless communication between the wireless communicator 36W and the external wireless communicator 37W of the external electric device 37.

As seen in FIGS. 8 to 11, the controller 36C is configured to set the wireless communicator 36W with the third mode M3 if a mode-change condition is satisfied in one of the first mode M1 and the second mode M2. For example, the controller 36C is configured to store the mode-change condition in the memory 36M.

Figure 8:
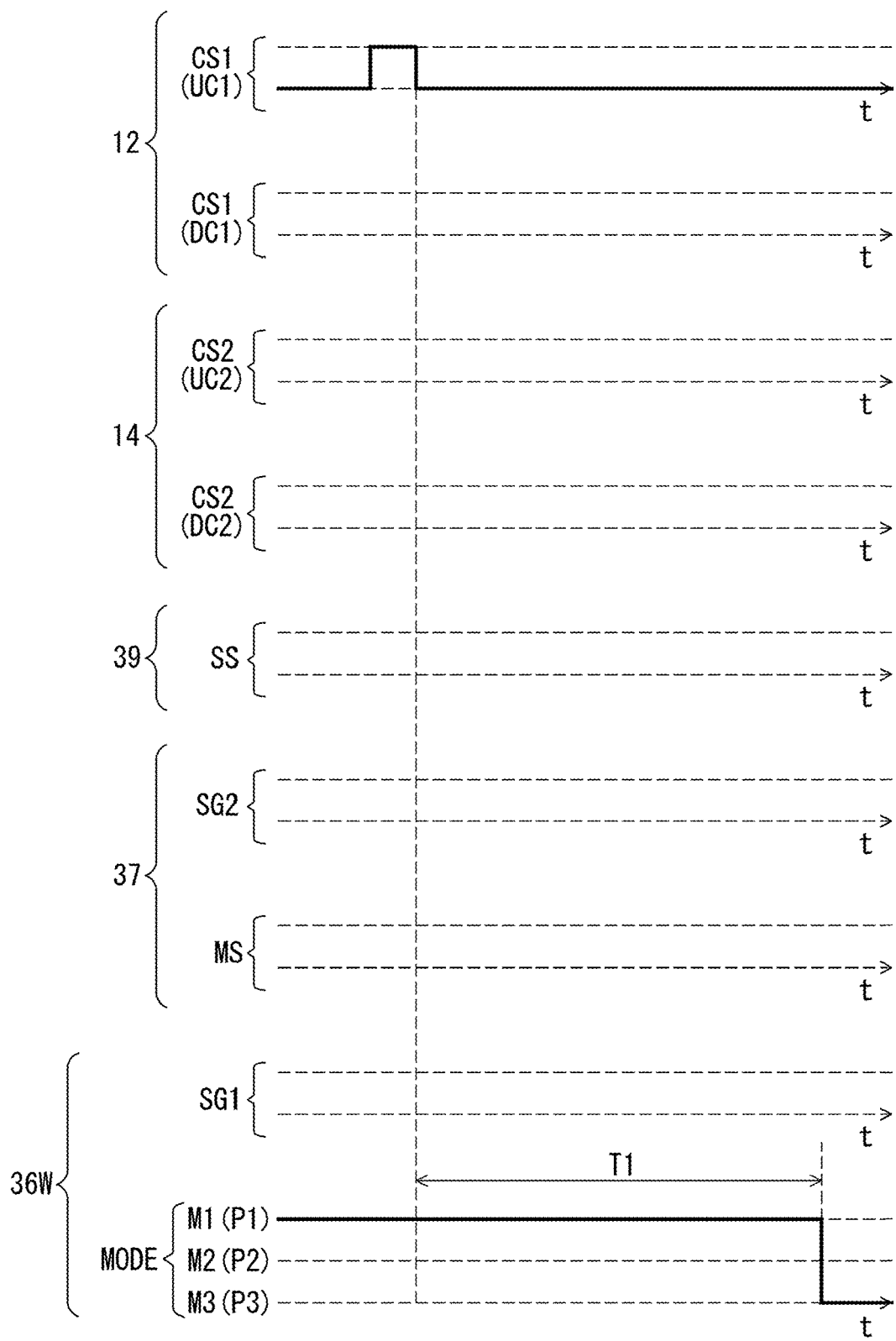
Figure 9:
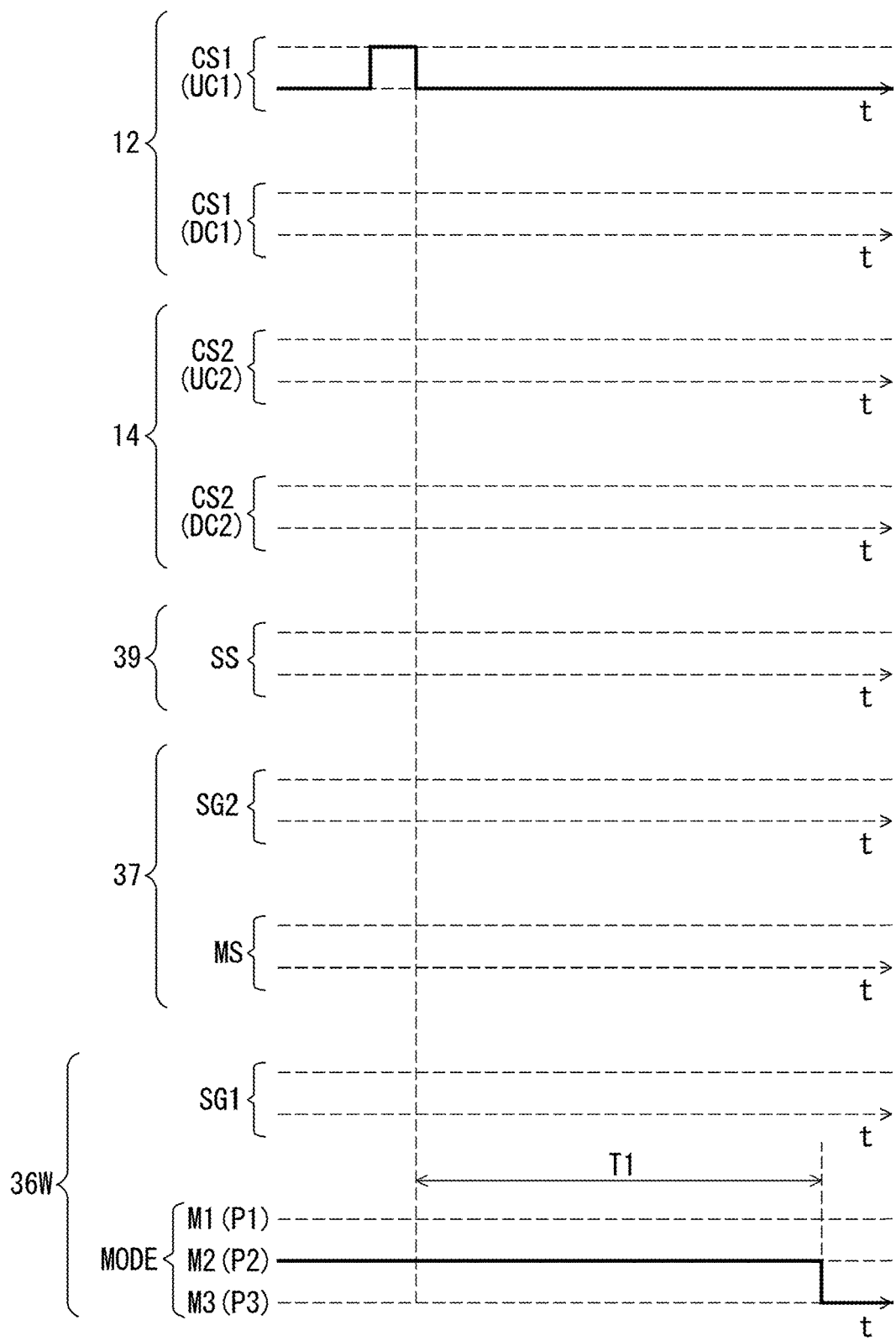

As seen in FIGS. 8 and 9, in this embodiment, the mode-change condition includes that a determination time TD elapses without receiving the control signal CS1 from the operating wireless communicator 16W of the operating device 12 in one of the first mode M1 and the second mode M2. Namely, the controller 36C is configured to set the wireless communicator 36W with the third mode M3 if the determination time TD elapses without receiving the control signal CS1 from the operating wireless communicator 16W of the operating device 12 in one of the first mode M1 and the second mode M2.

Figure 10:
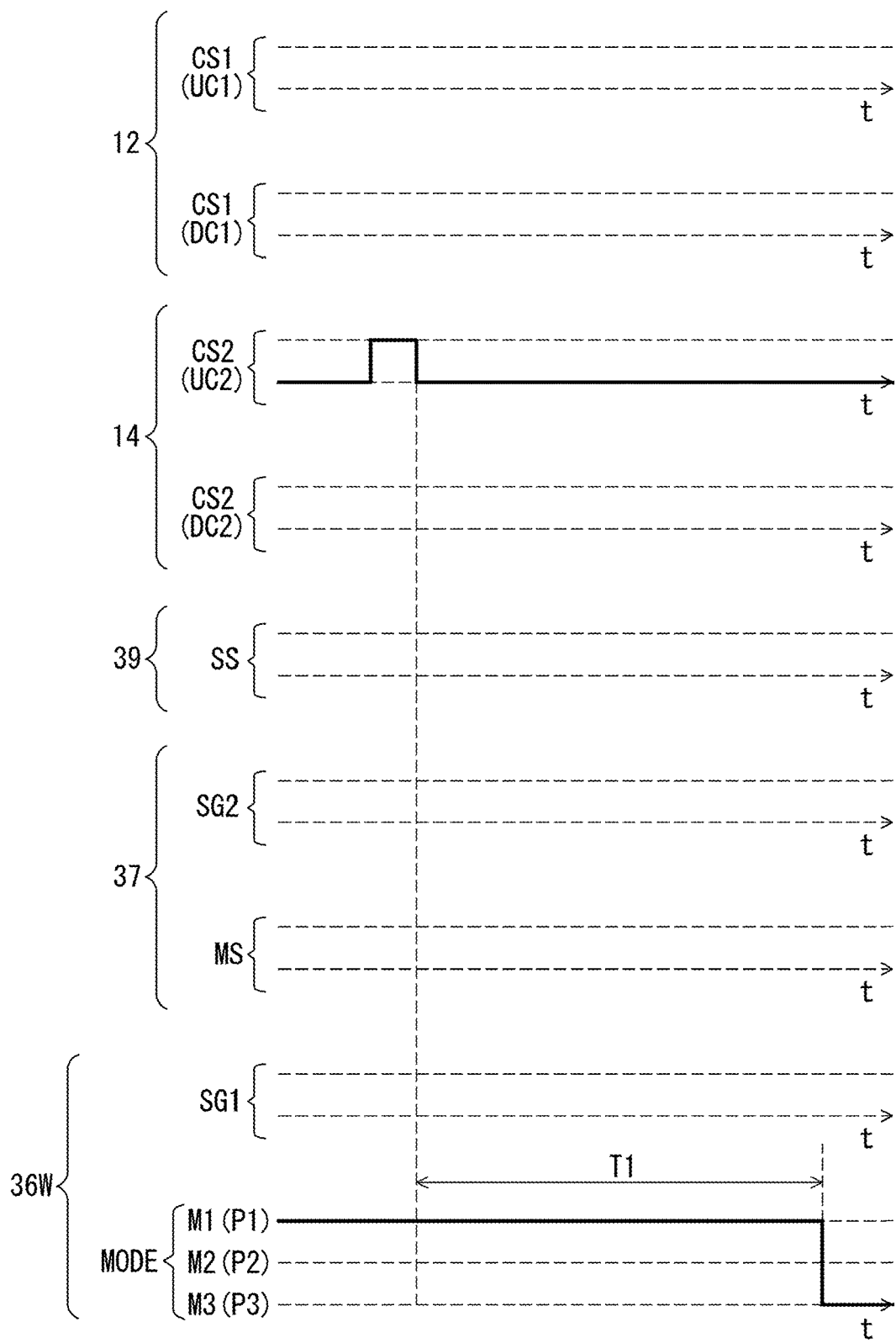
Figure 11:
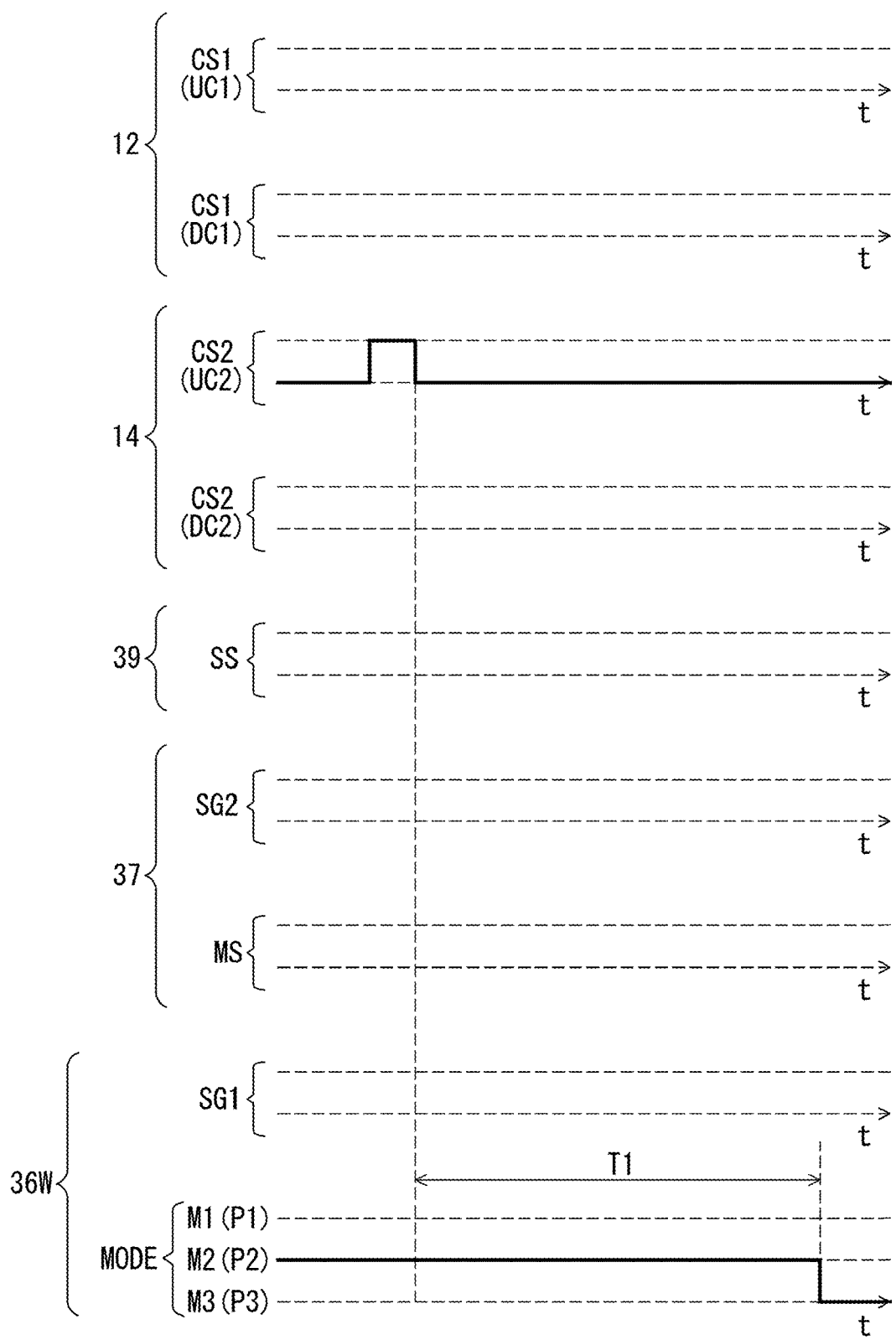

As seen in FIGS. 10 and 11, in this embodiment, the mode-change condition includes that the determination time TD elapses without receiving the control signal CS2 from the operating wireless communicator 26W of the operating device 14 in one of the first mode M1 and the second mode M2. Namely, the controller 36C is configured to set the wireless communicator 36W with the third mode M3 if the determination time TD elapses without receiving the control signal CS2 from the operating wireless communicator 26W of the operating device 14 in one of the first mode M1 and the second mode M2. The controller 36C is configured to measure a time TM from a timing at which the first mode M1 or the second mode M2 starts and a timing at which the wireless communicator 36W detects the control signal CS1 or CS2. The controller 36C is configured to reset the time TM if the first mode M1 or the second mode M2 starts or if the controller 36C detects the control signal CS1 or CS2 in the first mode M1 or the second mode M2. The mode-change condition is not limited to the above conditions.

Figure 12:
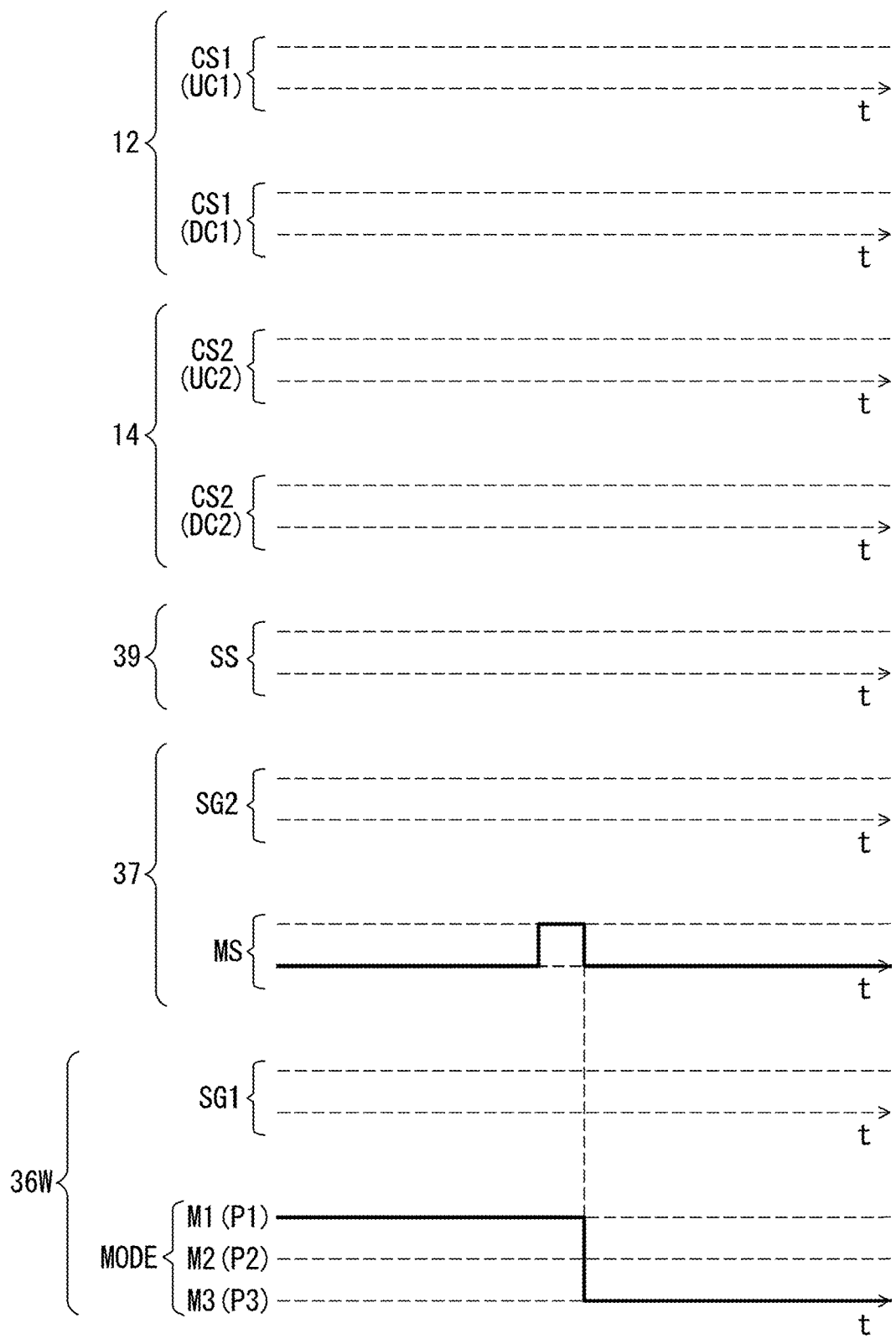
Figure 13:
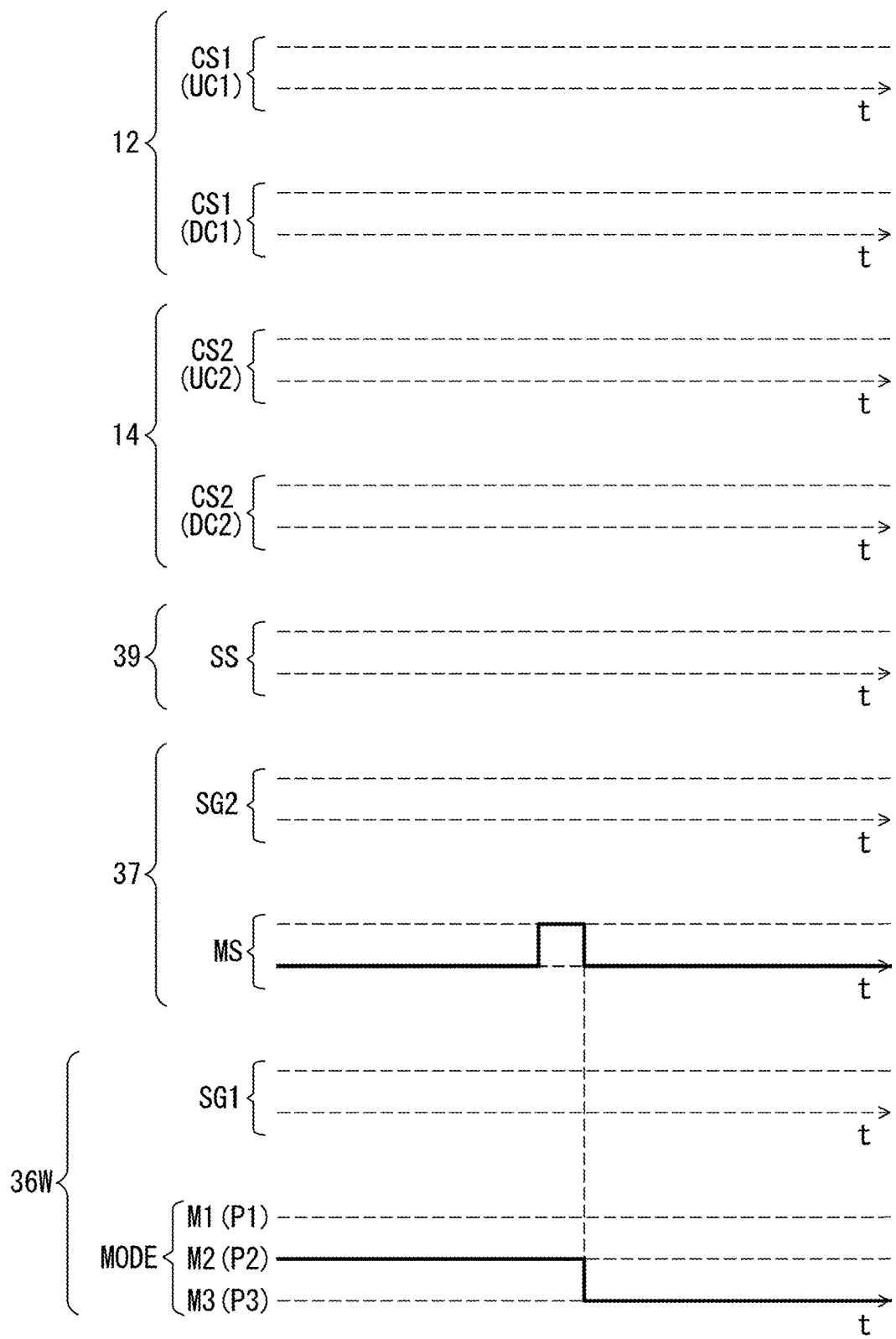

Furthermore, as seen in FIGS. 12 and 13, the mode-change condition includes that the wireless communicator 36W receives a mode-change signal MS from the external wireless communicator 37W of the external electric device 37 in one of the first mode M1 and the second mode M2. Namely, the controller 36C is configured to set the wireless communicator 36W with the third mode M3 if the wireless communicator 36W recognizes the mode-change signal MS in one of the first mode M1 and the second mode M2.

Figure 14:
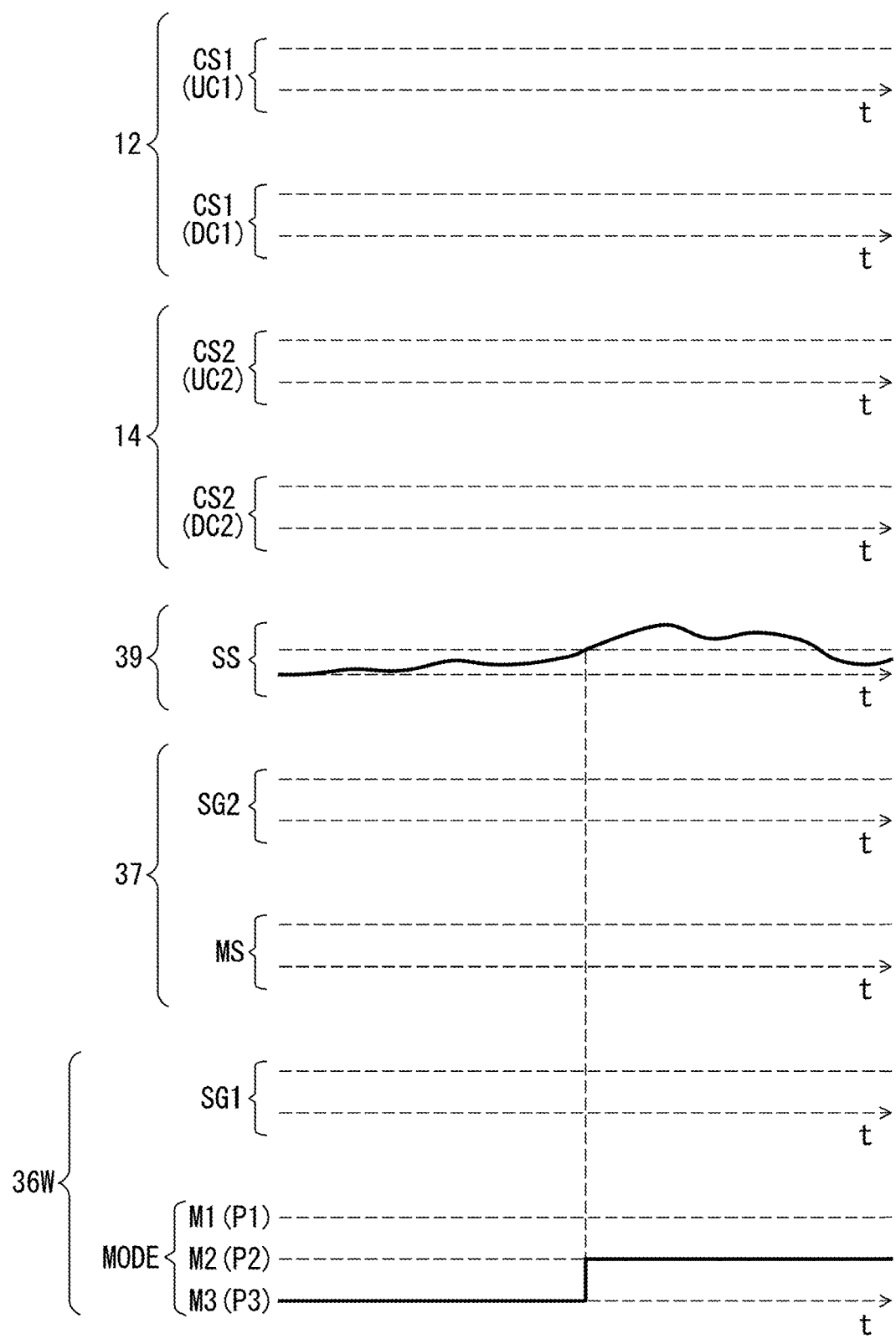

As seen in FIG. 14, the controller 36C is configured to detect a state signal SS transmitted from a usage state sensor 39 configured to sense a usage state of the human-powered vehicle VH. In this embodiment, the controller 36C is configured to detect the state signal SS in the third mode M3. The usage state sensor 39 includes an acceleration sensor 39A configured to sense acceleration AC applied to the human-powered vehicle VH. The usage state sensor 39 is mounted to the master unit 32. However, the usage state sensor 39 can be provided at other devices or other locations. The usage state sensor 39 can include another sensor (e.g., a seating sensor attached to the saddle BC3 or the seatpost BC4, a pedal sensor attached to a pedal) other than the acceleration sensor 39A instead of or in addition to the acceleration sensor 39A.

The controller 36C is configured to set the wireless communicator 36W with the second mode M2 if the controller 36C concludes that the state signal SS indicates that the human-powered vehicle VH is in use as the wireless communicator 36W is in the third mode M3. In this embodiment, the controller 36C is configured to set the wireless communicator 36W with the second mode M2 if the controller 36C concludes that the state signal SS indicates that the acceleration AC exceeds an acceleration threshold AT as the wireless communicator 36W is in the third mode M3. A determination time can apply to the determination of whether the acceleration AC exceeds the acceleration threshold AT. The controller 36C is configured not to set the wireless communicator 36W with the third mode M3 if the acceleration AC gets lower than the acceleration threshold AT after exceeding the acceleration threshold AT. However, the controller 36C can utilize the state signal SS to set the wireless communicator 36W with the first mode M1 and/or the second mode M2.

The wireless communication device 36 further comprises a switch 40 configured to receive a user input UW. The controller 36C is configured to set the wireless communicator 36W with the first mode M1 if the controller 36C detects the user input UW of the switch 40 in one of the second mode M2 and the third mode M3. In this embodiment, the switch 40 is mounted on the master unit 32. The switch is electrically connected to the controller 36C. However, the switch 40 can be mounted on other devices. The switch 40 can be omitted from the wireless communication device 36.

The controller 36C is configured to count a total number of operation times NC that the switch 40 receives the user input UW. The controller 36C is configured to set the wireless communicator 36W with the first mode M1 if the controller 36C detects the user input UW of the switch 40 in one of the second mode M2 and the third mode M3 and if the controller 36C concludes that the total number of operation times NC is equal to or smaller than a determination threshold NT. Thus, it is possible to change the mode of the wireless communicator 36W from one of the second mode M2 and the third mode M3 to the first mode M1 if the external electric device 37 cannot be used in a case where the external electric device 37 has a dead battery, where the external electric device 37 is broken, or where the user forgets to carry the external electric device 37. In this embodiment, the switch 40 includes a switch circuit having a contact. The switch 40 includes a normally open switch. However, the switch 40 can include another structure. The switch 40 can also be referred to as an emergency switch 40. The controller 36C is configured to store the determination threshold NT in the memory 36M. The limitation using the determination threshold NT can be omitted from the operation of the wireless communication device 36.

The controller 36C is configured to maintain the wireless communicator 36W in the one of the second mode M2 and the third mode M3 as the controller 36C concludes that the total number of operation times NC exceeds the determination threshold NT even if the controller 36C detects the user input UW of the switch 40 in the one of the second mode M2 and the third mode M3. The controller 36C is configured to reset the total number of operation times NC if the wireless communicator 36W establishes wireless communication between the wireless communicator 36W and the external wireless communicator 37W of the external electric device 37.

Figure 15:
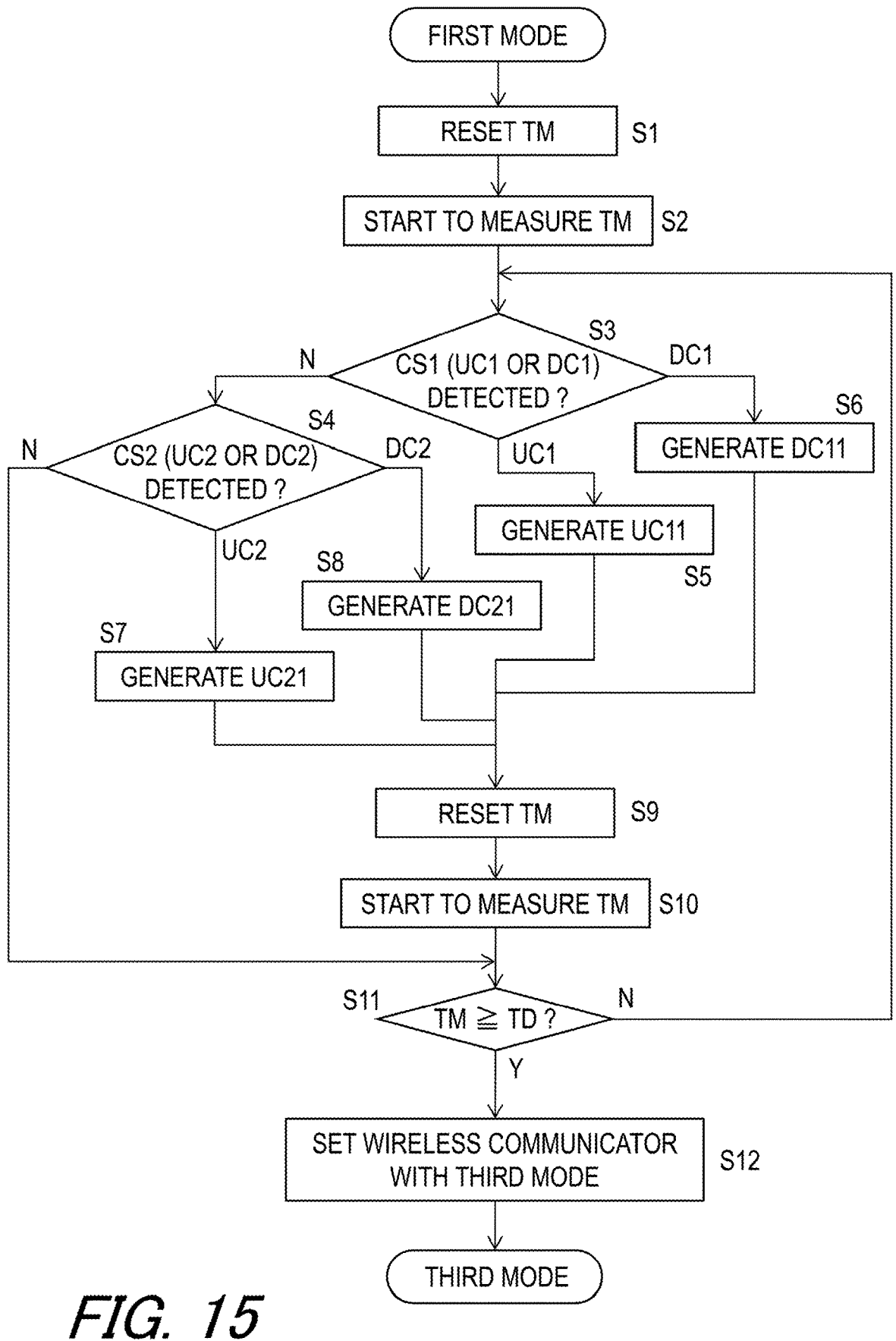
FIG. 15 is a flow chart of the operation of the operating system illustrated in FIG. 2 (first mode).

As seen in FIG. 15, in the first mode M1, the controller 36C resets the time TM and starts to measure the time TM if the first mode M1 starts (Steps S1 and S2). The controller 36C determines whether the controller 36C detects the control signal CS1 or CS2 (Steps S3 and S4). Specifically, the controller 36C determines whether the controller 36C detects the upshift control signal UC1, the downshift control signal DC1, the upshift control signal UC2, and the downshift control signal DC2 (Steps S3 and S4). The controller 36C generates the upshift command UC11 if the controller 36C detects the upshift control signal UC1 (Steps S3 and S5). The controller 36C generates the downshift command DC11 if the controller 36C detects the downshift control signal DC1 (Steps S3 and S6). The controller 36C generates the upshift command UC21 if the controller 36C detects the upshift control signal UC2 (Steps S4 and S7). The controller 36C generates the downshift command DC21 if the controller 36C detects the downshift control signal DC2 (Steps S4 and S8).

The controller 36C resets the time TM if the controller 36C concludes that the controller 36C detects the control signal CS1 or CS2 (Steps S3, S4, and S9). Specifically, the controller 36C resets the time TM after one of the upshift command UC11, the downshift command DC11, the upshift command UC21, and the downshift command DC21. The controller 36C starts to measure the time TM after resetting the time TM (Steps S9 and S10). The process enters Step S11 if the controller 36C detects neither the control signal CS1 nor CS2 (Steps S3 and S4).

The controller 36C determines whether the time TM is equal to or longer than the determination time TD (Step S11). The process returns to the step S3 if the time TM is shorter than the determination time TD (Step S11). The controller 36C sets the wireless communicator 36W with the third mode M3 if the time TM is equal to or longer than the determination time TD (Steps S11 and S12). Namely, the controller 36C sets the wireless communicator 36W with the third mode M3 if the determination time TD elapses without receiving the control signal CS1 or CS2 in the first mode M1.

Figure 16:
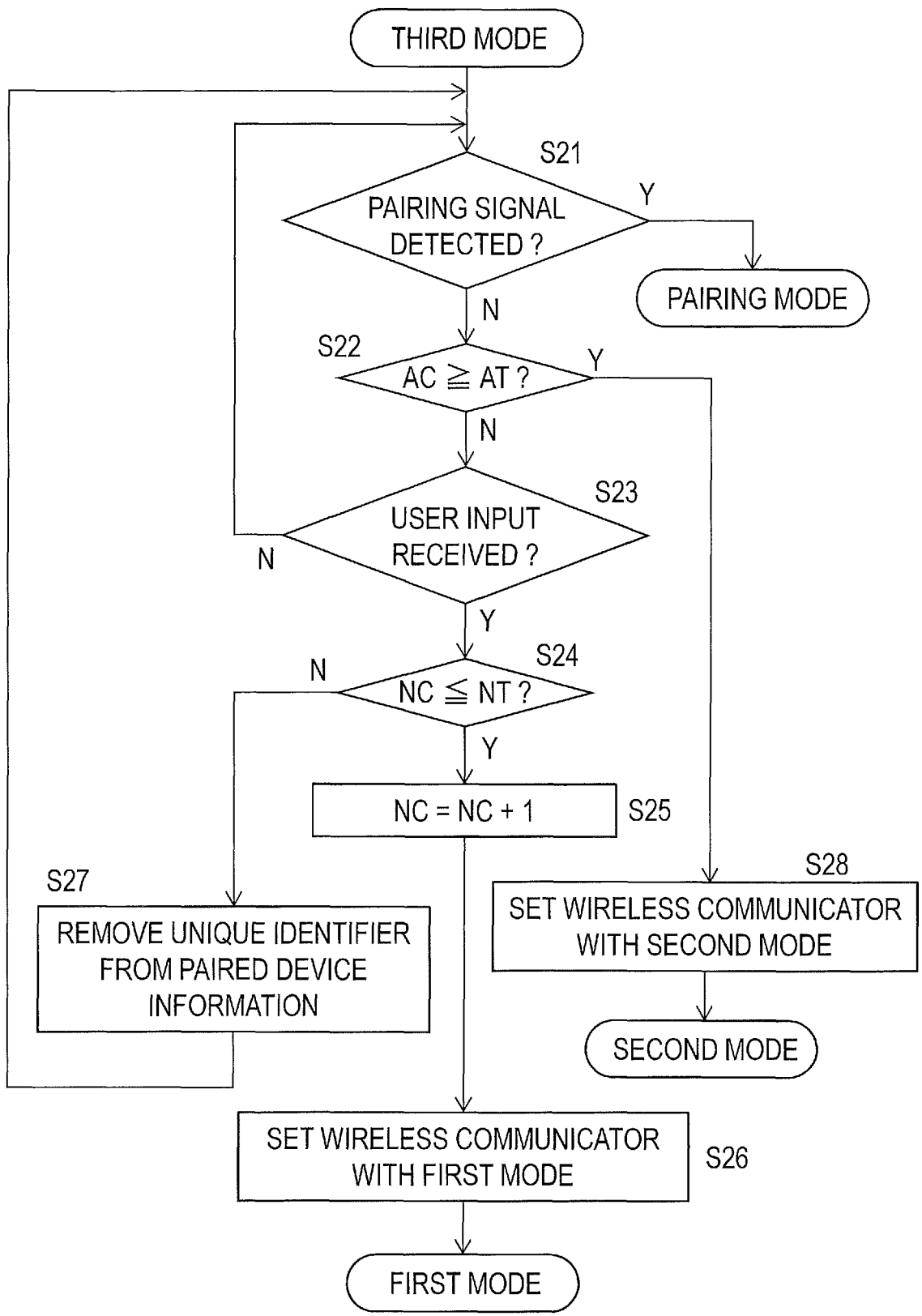
FIG. 16 is a flow chart of the operation of the operating system illustrated in FIG. 2 (third mode).

As seen in FIG. 16, in the third mode M3, the controller 36C determines whether the controller 36C detects a pairing signal to enter a pairing mode if the third mode M3 starts (Step S21). The controller 36C sets the wireless communicator 36W with the pairing mode if the controller 36C detects the pairing signal (Step S21). Since the pairing mode has been known in the wireless technology field, it will not be described in detail here for the sake of brevity.

The controller 36C determines whether the acceleration AC indicated by the state signal SS is equal to or larger than the acceleration threshold AT if the controller 36C does not detect the pairing signal (Step S22). The controller 36C sets the wireless communicator 36W with the second mode M2 if the acceleration AC is equal to or larger than the acceleration threshold AT (Step S22 and S26). The controller 36C determines whether the switch 40 receives the user input UW if the acceleration AC is smaller than the acceleration threshold AT (Steps S22 and S23). The process returns to Step S21 if the switch 40 does not receive the user input UW (Step S23).

The controller 36C determines whether the total number of operation times NC exceeds the determination threshold NT if the switch 40 receives the user input UW (Steps S23 and S24). The controller 36C increments the total number of operation times NC by one if the controller 36C concludes that the total number of operation times NC is equal to or smaller than the determination threshold NT (Steps S24 and S25). The controller 36C sets the wireless communicator 36W with the first mode M1 after incrementing the total number of operation times NC (Step 26).

The controller 36C maintains the third mode M3 as the controller 36C concludes that the total number of operation times NC exceeds the determination threshold NT even if the switch 40 receives the user input UW (Steps S24). The controller 36C removes the unique identifier of the external electric device 37 from the paired device information stored in the memory 36M if the total number of operation times NC exceeds the determination threshold NT (Steps S24 and S27). Thus, the controller 36C again needs the pairing with the external electric device 37 to establish wireless communication between the wireless communicator 36W and the external wireless communicator 37W. The process returns to Step S21.

Figure 17:
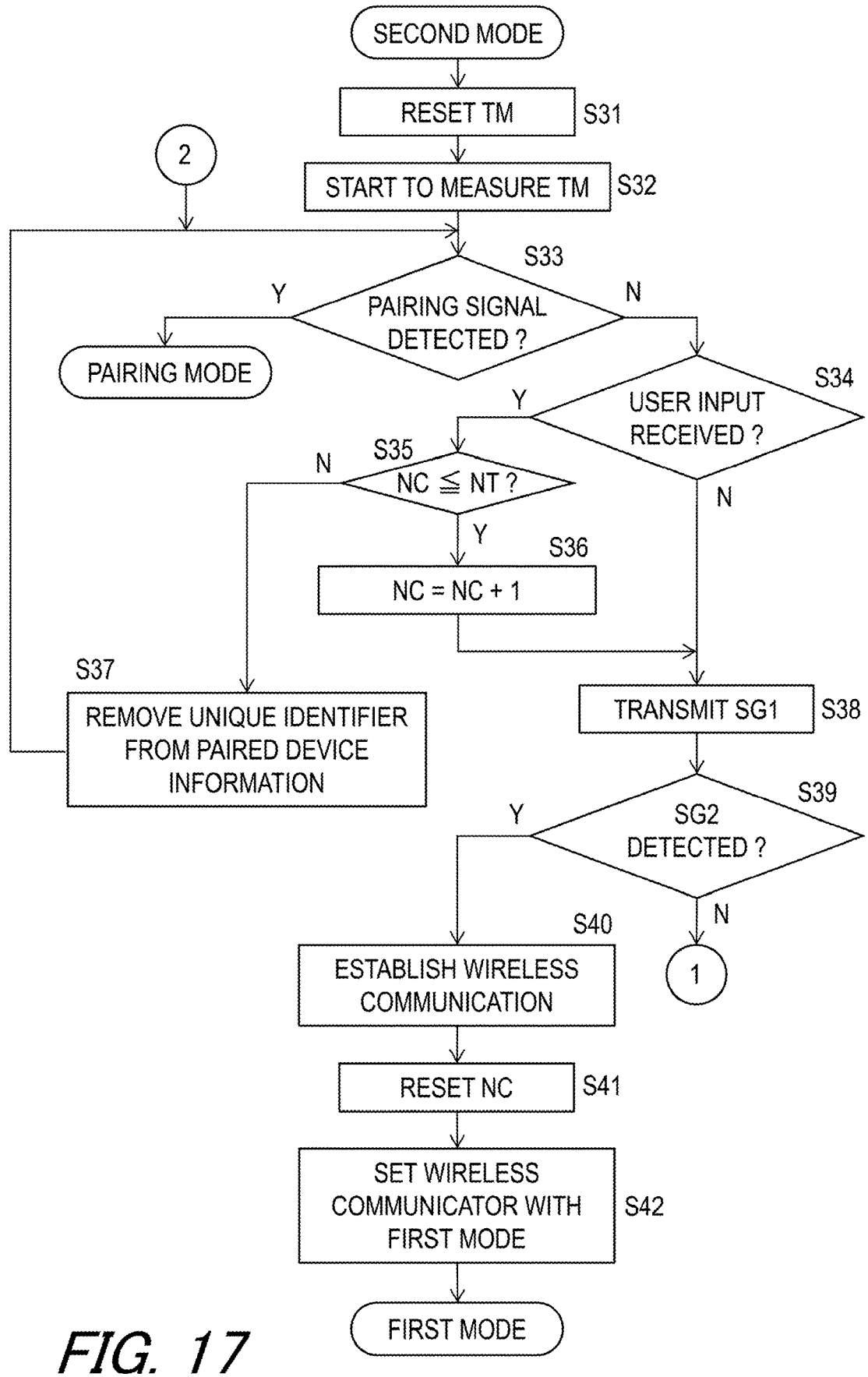
FIGS. 17 and 18 are flow charts of the operation of the operating system illustrated in FIG. 2 (second mode).

As seen in FIG. 17, in the second mode M2, the controller 36C resets the time TM and starts to measure the time TM if the second mode M2 starts (Steps S31 and S32). the controller 36C determines whether the controller 36C detects a pairing signal to enter a pairing mode if the third mode M3 starts (Step S33). The controller 36C sets the wireless communicator 36W with the pairing mode if the controller 36C detects the pairing signal (Step S33). The controller 36C determines whether the switch 40 receives the user input UW if the controller 36C does not detect the pairing signal (Steps S33 and S34).

The controller 36C determines whether the total number of operation times NC exceeds the determination threshold NT if the switch 40 receives the user input UW (Steps S34 and S35). The controller 36C increments the total number of operation times NC by one if the controller 36C concludes that the total number of operation times NC is equal to or smaller than the determination threshold NT (Steps S35 and S36).

The controller 36C maintains the second mode M2 as the controller 36C concludes that the total number of operation times NC exceeds the determination threshold NT even if the switch 40 receives the user input UW (Steps S35). The controller 36C removes the unique identifier of the external electric device 37 from the paired device information stored in the memory 36M if the total number of operation times NC exceeds the determination threshold NT (Steps S35 and S37). Thus, the controller 36C again needs the pairing with the external electric device 27 to establish wireless communication between the wireless communicator 36W and the external wireless communicator 37W. The process returns to Step S33.

The controller 36C wirelessly transmits the connection demand signal SG1 if the switch 40 does not receive the user input UW (Step S34 and S38). The controller 36C wirelessly transmits the connection demand signal SG1 as the total number of operation times NC is equal to or smaller than the determination threshold NT if the switch 40 receives the user input UW (Step S34, S35, and S38).

The controller 36C determines whether the controller 36C detects the connection signal SG2 wirelessly transmitted from the external electric device 37 after wirelessly transmitting the connection demand signal SG1 (Step S39). The controller 36C establishes wireless communication between the wireless communicator 36W and the external wireless communicator 37W if the controller 36C detects the connection signal SG2 (Steps S39 and S40). The controller 36C resets the total number of operation times NC if the wireless communicator 36W establishes wireless communication between the wireless communicator 36W and the external wireless communicator 37W (Step S41). The controller 36C sets the wireless communicator 36W with the first mode M1 after establishing wireless communication between the wireless communicator 36W and the external wireless communicator 37W (Step S42).

Figure 18:
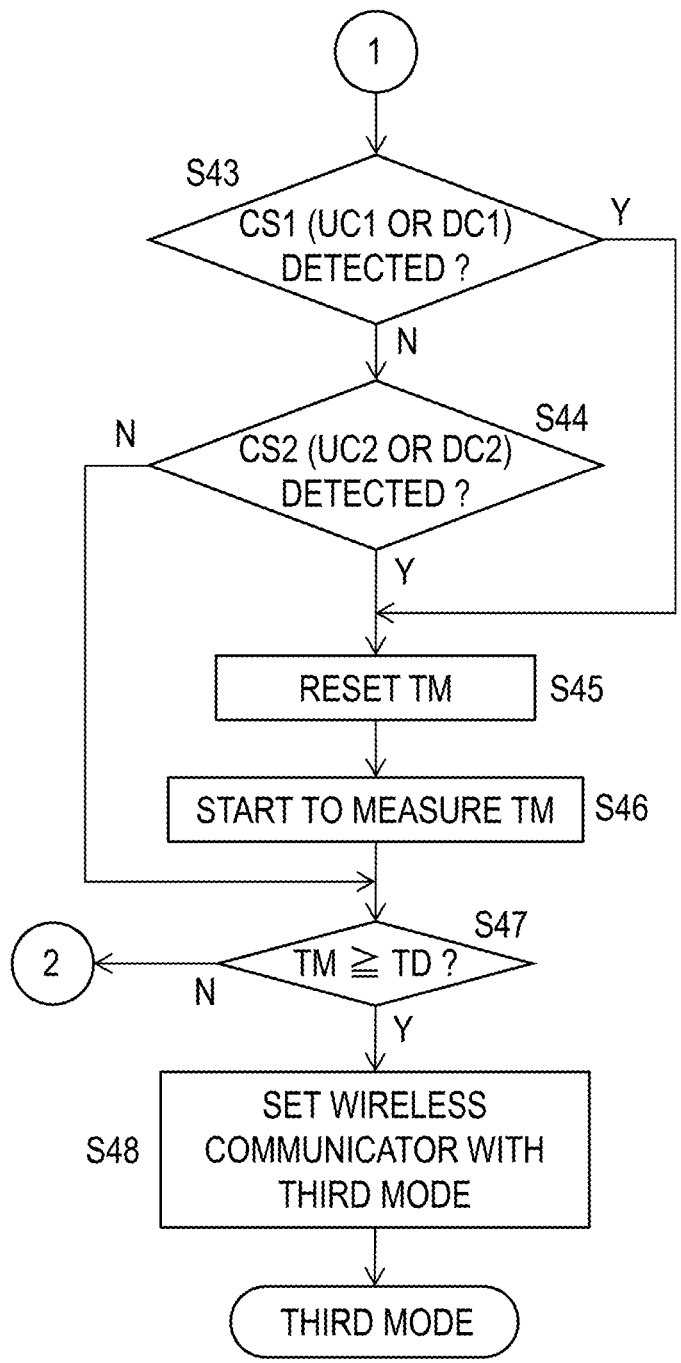

As seen in FIGS. 17 and 18, the controller 36C determines whether the controller 36C detects the control signal CS1 or CS2 if the controller 36C does not detect the connection signal SG2 wirelessly transmitted from the external electric device 37 (Steps S39, S43, and S44). As seen in FIG. 18, the controller 36C resets the time TM if the controller 36C detects the control signal CS1 or CS2 (Steps S43, S44, and S45). The controller 36C starts to measure the time TM after resetting the time TM (Step S46). The process enters Step S47 if the controller 36C detects neither the control signal CS1 nor CS2 (Steps S43 and S44).

In Step S47, the controller 36C determines whether the time TM is equal to or longer than the determination time TD (Step S47). The process returns to the step S33 if the time TM is shorter than the determination time TD (Step S47). The controller 36C sets the wireless communicator 36W with the third mode M3 if the time TM is equal to or longer than the determination time TD (Steps S47 and S48). Namely, the controller 36C sets the wireless communicator 36W with the third mode M3 if the determination time TD elapses without receiving the control signal CS1 or CS2 in the second mode M2.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Obviously, numerous modifications and variations of the present invention are possible in light of the above teachings. It is therefore to be understood that within the scope of the appended claims, the invention may be practiced otherwise than as specifically described herein.

What is claimed is:

1. A wireless communication device for a human-powered vehicle, comprising:
   a wireless communicator configured to wirelessly receive a control signal from an operating wireless communicator of an operating device, the wireless communicator having
      a first mode in which the wireless communicator receives the control signal from the operating wireless communicator of the operating device, and
      a second mode in which the wireless communicator ignores the control signal from the operating wireless communicator of the operating device; and
   a controller configured to store paired device information indicating a paired device which has been paired with the wireless communication device,
   the wireless communicator being configured to wirelessly transmit a connection demand signal in the second mode to establish wireless communication between the wireless communicator and an external wireless communicator of an external electric device different from the operating device,
   the wireless communicator being configured to wirelessly receive a connection signal which is wirelessly transmitted in response to the connection demand signal from the external wireless communicator of the external electric device, and
   the controller being configured to set the wireless communicator with the first mode in which the wireless communicator receives the control signal from the operating wireless communicator of the operating device if the connection signal from the external electric device indicates that the external electric device is the paired device.

2. The wireless communication device according to claim 1, wherein
the wireless communicator is configured to establish wireless communication between the wireless communicator and the external wireless communicator of the external electric device if the connection signal indicates that the external electric device is the paired device.

3. The wireless communication device according to claim 2, wherein
the controller is configured to set the wireless communicator with the first mode after the wireless communicator establishes wireless communication between the wireless communicator and the external wireless communicator of the external electric device if the connection signal indicates that the external electric device is the paired device.

4. The wireless communication device according to claim 1, wherein
the wireless communicator runs on a first power consumption in the first mode and runs on a second power consumption which is lower than the first power consumption in the second mode.

5. The wireless communication device according to claim 1, wherein
the wireless communicator runs on a first power consumption in the first mode, and
the wireless communicator has a third mode in which the wireless communicator runs on a third power consumption which is lower than the first power consumption.

6. The wireless communication device according to claim 5, wherein
the controller is configured to set the wireless communicator with the third mode if a mode-change condition is satisfied in one of the first mode and the second mode.

7. The wireless communication device according to claim 6, wherein
the mode-change condition includes that a determination time elapses without receiving the control signal from the operating wireless communicator of the operating device in one of the first mode and the second mode.

8. The wireless communication device according to claim 6, wherein
the mode-change condition includes that the wireless communicator receives a mode-change signal from the external wireless communicator of the external electric device in one of the first mode and the second mode.

9. The wireless communication device according to claim 1, further comprising
a switch configured to receive a user input, wherein
the controller is configured to set the wireless communicator with the first mode if the controller detects the user input of the switch in one of the second mode and the third mode.

10. The wireless communication device according to claim 9, wherein
the controller is configured to count a total number of operation times that the switch receives the user input, and
the controller is configured to set the wireless communicator with the first mode if the controller detects the user input of the switch in one of the second mode and the third mode and if the controller concludes that the total number of operation times is equal to or smaller than a determination threshold.

11. The wireless communication device according to claim 10, wherein
the controller is configured to maintain the wireless communicator in the one of the second mode and the third mode as the controller concludes that the total number of operation times exceeds the determination threshold even if the controller detects the user input of the switch in the one of the second mode and the third mode.

12. The wireless communication device according to claim 11, wherein
the controller is configured to reset the total number of operation times if the wireless communicator establishes wireless communication between the wireless communicator and the external wireless communicator of the external electric device.

13. An operating system for a human-powered vehicle, comprising:
the wireless communication device according to claim 1; and
the external electric device including the external wireless communicator configured to wirelessly transmit the connection signal.

14. The operating system according to claim 13, further comprising:
the operating device having the operating wireless communicator.

15. A wireless communication device for a human-powered vehicle, comprising:
a wireless communicator configured to wirelessly receive a control signal from an operating wireless communicator of an operating device, the wireless communicator having
a first mode in which the wireless communicator receives the control signal from the operating wireless communicator, and
a second mode in which the wireless communicator ignores the control signal from the operating wireless communicator; and
a controller configured to store paired device information indicating a paired device which has been paired with the wireless communication device,
the wireless communicator being configured to wirelessly transmit a connection demand signal in the second mode to establish wireless communication between the wireless communicator and an external wireless communicator of an external electric device different from the operating device,
the wireless communicator being configured to wirelessly receive a connection signal which is wirelessly transmitted in response to the connection demand signal from the external wireless communicator of the external electric device, and
the controller being configured to set the wireless communicator with the first mode if the connection signal indicates that the external electric device is the paired device, wherein
the wireless communicator runs on a first power consumption in the first mode,
the wireless communicator has a third mode in which the wireless communicator runs on a third power consumption which is lower than the first power consumption, the controller is configured to detect a state signal transmitted from a usage state sensor configured to sense a usage state of the human-powered vehicle, and the controller is configured to set the wireless communicator with the second mode if the controller concludes that the state signal indicates that the human-powered vehicle is in use as the wireless communicator is in the third mode.

16. The wireless communication device according to claim 15, wherein the usage state sensor includes an acceleration sensor configured to sense acceleration applied to the human-powered vehicle, and the controller is configured to set the wireless communicator with the second mode if the controller concludes that the state signal indicates that the acceleration exceeds an acceleration threshold as the wireless communicator is in the third mode.

* * * * *